United States Patent
Takahashi

(10) Patent No.: US 7,162,518 B2
(45) Date of Patent: Jan. 9, 2007

(54) NETWORK INTERFACE APPARATUS, IMAGE PROCESSING APPARATUS, DATA PROVIDING METHOD, AND PROGRAM

(75) Inventor: Hiroharu Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 10/081,839

(22) Filed: Feb. 25, 2002

(65) Prior Publication Data

US 2002/0124059 A1 Sep. 5, 2002

(30) Foreign Application Priority Data

Feb. 28, 2001 (JP) ............... 2001/055689

(51) Int. Cl.
*G06F 15/16* (2006.01)
(52) U.S. Cl. ............... 709/217; 709/219; 709/223
(58) Field of Classification Search ............... 709/219, 709/217–218, 223–225, 201, 203
See application file for complete search history.

(56) References Cited

U.S. PATENT DOCUMENTS

| | | | |
|---|---|---|---|
| 6,003,078 A * | 12/1999 | Kodimer et al. ............ 709/224 |
| 6,021,429 A * | 2/2000 | Danknick .................... 709/250 |
| 6,119,156 A * | 9/2000 | Filion et al. ................ 709/223 |
| 6,240,456 B1 * | 5/2001 | Teng et al. ................. 709/225 |
| 6,369,909 B1 * | 4/2002 | Shima ........................ 358/1.15 |
| 6,477,567 B1 * | 11/2002 | Ohara ........................ 709/223 |
| 6,490,052 B1 * | 12/2002 | Yanagidaira ................ 709/203 |
| 6,532,491 B1 * | 3/2003 | Lakis et al. ................. 709/223 |
| 6,603,565 B1 * | 8/2003 | Scheidig et al. ............ 358/1.13 |
| 6,615,372 B1 * | 9/2003 | Wang .......................... 714/46 |
| 6,631,407 B1 * | 10/2003 | Mukaiyama et al. ....... 709/223 |
| 2002/0078160 A1 * | 6/2002 | Kemp et al. ................ 709/203 |
| 2002/0078183 A1 * | 6/2002 | Helms ......................... 709/220 |
| 2002/0091822 A1 | 7/2002 | Tsuchitoi .................... 709/224 |
| 2002/0095508 A1 | 7/2002 | Okazawa .................... 709/230 |

FOREIGN PATENT DOCUMENTS

JP 11-134140 5/1999

\* cited by examiner

*Primary Examiner*—Philip B. Tran
(74) *Attorney, Agent, or Firm*—Fitzpatrick, Cella, Harper & Scinto

(57) ABSTRACT

A single network card product provides WEB data for managing printers in correspondence to printers of a plurality of types and in correspondence to a plurality of languages. Therefore, when the WEB data which depends on a type of printer is obtained from the printer, the network card requests WEB data corresponding to a selected language from the printer.

12 Claims, 21 Drawing Sheets

FIG. 2
```
< !DOCTYPE HTML PUBLIC"-//IETF//DTD HTML 2.0//EN" >
< HTML >
< HEAD >
< TITLE > WEB CONSOLE INTERFACE</TITLE>
< /HEAD >
< BODY >
< IMG SRC="/dev/device.png" >
< IMG SRC="/nic/error.png" >
< /BODY >
< /HTML >
```
FIG. 3
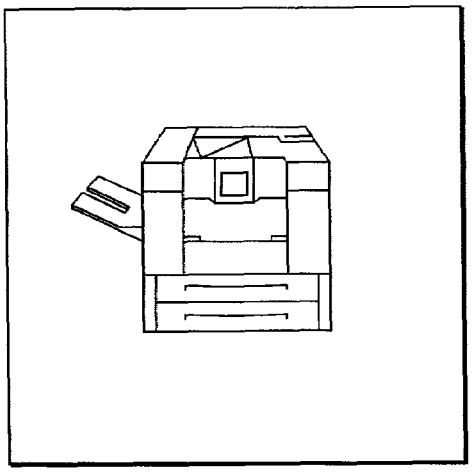
FIG. 4
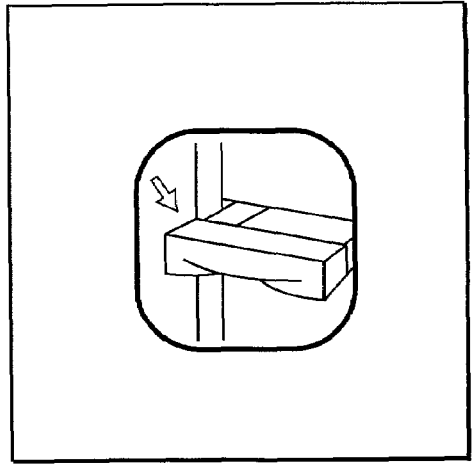

14-1 STANDARD 14-4 STANDARD+DUPLEX 14-2 250-SHEET CASSETTE 14-5 250-SHEET CASSETTE +DUPLEX 14-3 500-SHEET CASSETTE 14-6 500-SHEET CASSETTE +DUPLEX

FIG. 15

| BIT MAP IMAGE | 250-SHEET CASSETTE | 500-SHEET CASSETTE | DUPLEX |
|---|---|---|---|
| 14-1 | NO | NO | NO |
| 14-2 | YES | NO | NO |
| 14-3 | NO | YES | NO |
| 14-4 | NO | NO | YES |
| 14-5 | YES | NO | YES |
| 14-6 | NO | YES | YES |

SAMPLE IN JAPANESE LANGUAGE

NETWORK INTERFACE APPARATUS, IMAGE PROCESSING APPARATUS, DATA PROVIDING METHOD, AND PROGRAM

BACKGROUND OF THE INVENTION

1. Field of the Invention

The invention relates to a print system, a network interface apparatus, and a printer and, more particularly, to a print system, a network interface apparatus, and a printer, for distributing and arranging WEB contents (contents of information) which is provided to the user.

2. Related Background Art

In recent years, generally, a printer has been used in a network form owing to the spread of the Internet. Usually, in a printer at a high price such as high speed printer, color printer, or the like, there is a tendency such that a network interface is built in. However, in a printer at a low price such as a monochromatic printer or the like, the network interface is not built in the apparatus main body, but is often separately provided as a network card module.

In this case, the printer main body and the network card module individually have CPUs and the network card module is intelligent existence. The printer main body and the network card module communicate by the connected interface. This contrarily means that a network service of a heavy load can be ejected to the network card module, a load on the CPU of the printer main body can be relatively reduced, and costs of the printer main body can be reduced.

According to the conventional network interface, it is sufficient that merely print data represented by, for example, lpr can be transmitted. However, in recent years, since necessity to enable a host computer to manage information regarding the printer has been increased, various means have been provided as additional techniques.

As a simplest example, there is a method of enabling information management data (job control language=Job Language) to be also transmitted by a port for transmitting print data. Since the Job Language shares the port for transmitting the print data, there is no need to increase a dedicated service port and it can be relatively easily installed. However, there is a problem such that if a large amount of print data is transmitted, the port is occupied by the transmission of the print data, so that the transmission and reception of the information management data are stopped. There is also a drawback such that since the lpr protocol in the network is a unidirectional type connection, the host computer inherently cannot obtain the information from the printer.

As a next method, there is a technique such that the information is obtained from the printer by using an SNMP (Simple Network Management Protocol)/MIB (Management Information Base). It is a method whereby a dedicated port for data transmission and reception is used and the SNMP as a standard is used. According to such a method, however, it is necessary to independently develop a dedicated client program for providing a UI (User Interface) for receiving data from the printer by using the SNMP and displaying the received data. In addition, according to such a method, since the SNMP is originally a protocol for transmitting and receiving simple information, the information regarding a print layer can be provided only as simple data such as numeral, character train, or the like. Thus, the client program has to possess the information constructing the UI such as bit map image data showing a construction of an apparatus or the like. There is, consequently, a problem such that the client program has to be developed so that it can cope with all apparatuses.

As a latest method, there is a method whereby the network card module is equipped with a WWW server for providing HTTP (Hyper Text Transfer Protocol) services and providing WEB contents such as HTML (Hyper Text Markup Language) data regarding the apparatus information or bit map image data via a network. A client computer displays the WEB contents onto a GUI (Graphical User Interface) by using a general WEB browser. The user can also operate the printer by the displayed WEB contents. Thus, even if a dedicated client program is not provided, the user can see the information regarding the printer or operate the printer. According to the conventional methods, it is necessary that the dedicated client flu program manages all of information (message character train, bit map images) that is peculiar to each of various apparatuses. According to the method using the WWW server, however, it is sufficient that the apparatus possesses only the information regarding the apparatus itself, and products can be provided in a short period of time.

SUMMARY OF THE INVENTION

However, the foregoing conventional techniques have the following problems. That is; since the foregoing HTTP service is one of functions of the network, it is desirable that it is installed fundamentally on the network card module. In order to reduce development costs by a common construction and reduce product costs by mass production, the network card module is usually designed so that it can be connected to printers of a plurality of models.

However, each of the printers of a plurality of models has a message according to each apparatus and information that is peculiar to each apparatus. Therefore, in order to provide services for the printers of all of the models, the network card module has to hold the peculiar information of all of the printers. A necessary capacity of an ROM of the network card module increases and costs increase.

Further, there is a problem such that in order to allow the network card module to cope also with a printer which is sold after the network card module is sold, firmware of the network card module has to be rewritten each time, surplus maintenance work occurs, and costs for the maintenance rise.

The invention is made in consideration of the foregoing problems. WEB contents which depends on a type of printer is distributed and arranged to the printer main body, and WEB contents which does not depend on a type of printer is distributed and arranged to the network card module, so that the network card module does not need to have the WEB contents with respect to the printers of all models each having a possibility to be connected, and memory capacity costs of the network card module can be reduced, or the like.

Further, even if the printer copes with a plurality of countries, it is desirable that WEB contents of a plurality of languages can be provided by a single network module. Similarly, also in the case where the printers are shipped to a plurality of destinations, it is preferable that the WEB contents of a plurality of languages can be provided by the single network module. For this purpose, when the necessary WEB contents depends on the apparatus type, the network card module obtains the WEB contents corresponding to designated languages from the printer main body.

BRIEF DESCRIPTION OF THE DRAWINGS

FIG. 2 is an explanatory diagram showing an example of an expression of an HTML;

FIG. 3 is an explanatory diagram showing a bit map image illustrating an outline of an apparatus as an example of WEB contents which depends on an apparatus type;

FIG. 4 is an explanatory diagram showing a bit map image serving as an abstract icon indicative of a request for papers as an example of WEB contents which does not depend on the apparatus type;

FIG. 15 is an explanatory diagram showing a correspondence relation between bit map images and apparatus constructions;

DESCRIPTION OF THE PREFERRED EMBODIMENTS

An embodiment of the invention will be described in detail hereinbelow with reference to the drawings.

Figure 1:
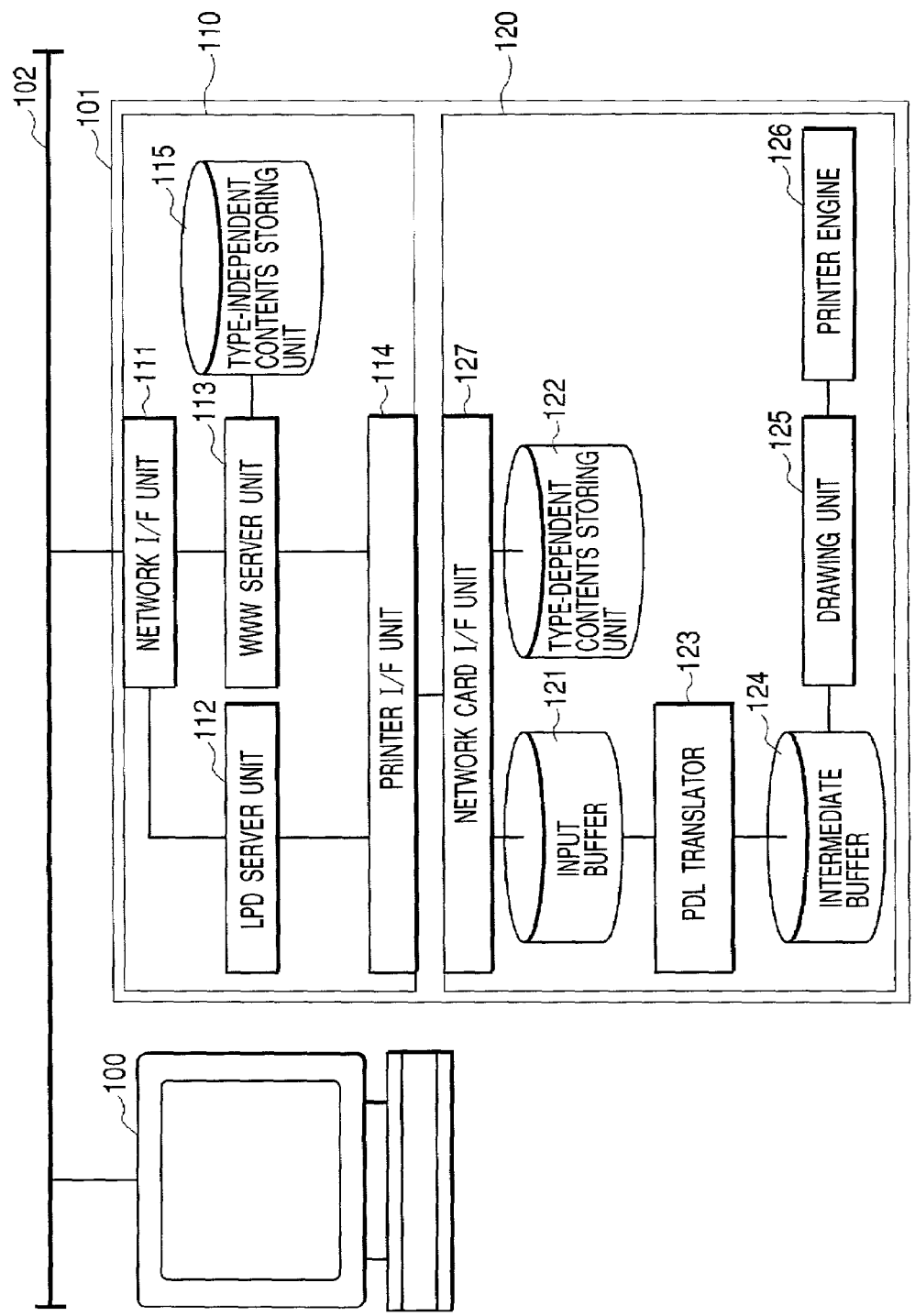
FIG. 1 is a block diagram showing an example of a construction of a print system.

FIG. 1 is a block diagram showing an example of a construction of a print system. This print system is constructed by: a host computer 100; a printer 101 having a network card unit 110 and a printing unit 120; and a predetermined communication medium 102 such as Ethernet (LAN having a bus structure which has been developed in common by three companies of Xerox Co., Ltd. of U.S.A., DEC Co., Ltd., and Intel Co., Ltd.) or the like for connecting the host computer 100 and printer 101.

The printer can be also replaced with an image processing apparatus such as laser beam printer, ink let printer, copying machine, hybrid apparatus, facsimile apparatus, scanner, or the like.

Further, the network card unit 110 of the printer 101 comprises: a network I/F unit 111; an lpd server unit 112; a WWW (World Wide Web) server unit 113; a printer I/F unit 114; and a type-independent contents storing unit 115. The printing unit 120 of the printer 101 comprises: an input buffer 121; a type-dependent contents storing unit 122; a PDL translator 123; an intermediate buffer 124; a drawing unit 125; a printer engine 126; and a network card I/F unit 127.

The above construction will now be described in detail. The network I/F unit 111 makes communication with the communication medium 102 and transfers data received via the communication medium 102 to the next stage in accordance with services. The lpd server unit 112 is a server unit for supporting a Line Printer Daemon Protocol <RFC1179> and supporting a print application based on a protocol which has been predetermined by the RFC1179 and receives print data transmitted from the host computer 100. The WWW server unit 113 transmits and receives HTML data for expressing a status of the printer 101 by using the HTTP in accordance with a request from the host computer 100. The printer I/F unit 114 transmits the print data to the printing unit 120 and requests type-dependent contents from the printing unit 120. The type-independent contents storing unit 115 stores the type-independent HTML data and bit map data into the WWW server unit 113.

The network card I/F unit 127 makes communication with the printer I/F unit 114 and transfers data based on the communication to the next stage in accordance with the services. The input buffer 121 is constructed by an RAM or an HDD device, receives the print data, and transfers it to the PDL translator 123. The type-dependent contents storing unit 122 stores the type-dependent HTML data and bit map data. The PDL translator 123 extracts the print data stored in the input buffer 121, analyzes a PDL (Page Description Language), and converts it into intermediate data for drawing.

The intermediate buffer 124 temporarily stores intermediate data for drawing which was converted by the PDL translator 123 and transfers it to the drawing unit 125. The drawing unit 125 extracts the intermediate data for drawing from the intermediate buffer 124, converts it into raster data, and transfers it to the printer engine 126. The printer engine 126 prints an image onto paper on the basis of the raster data converted by the drawing unit 125 by using the well-known electrophotographic technique or ink jet technique and ejects a printed matter. The printer engine 126 uses the well-known print technique. For example, an electrophotographic system or an ink jet system is generally used.

Figure 13:
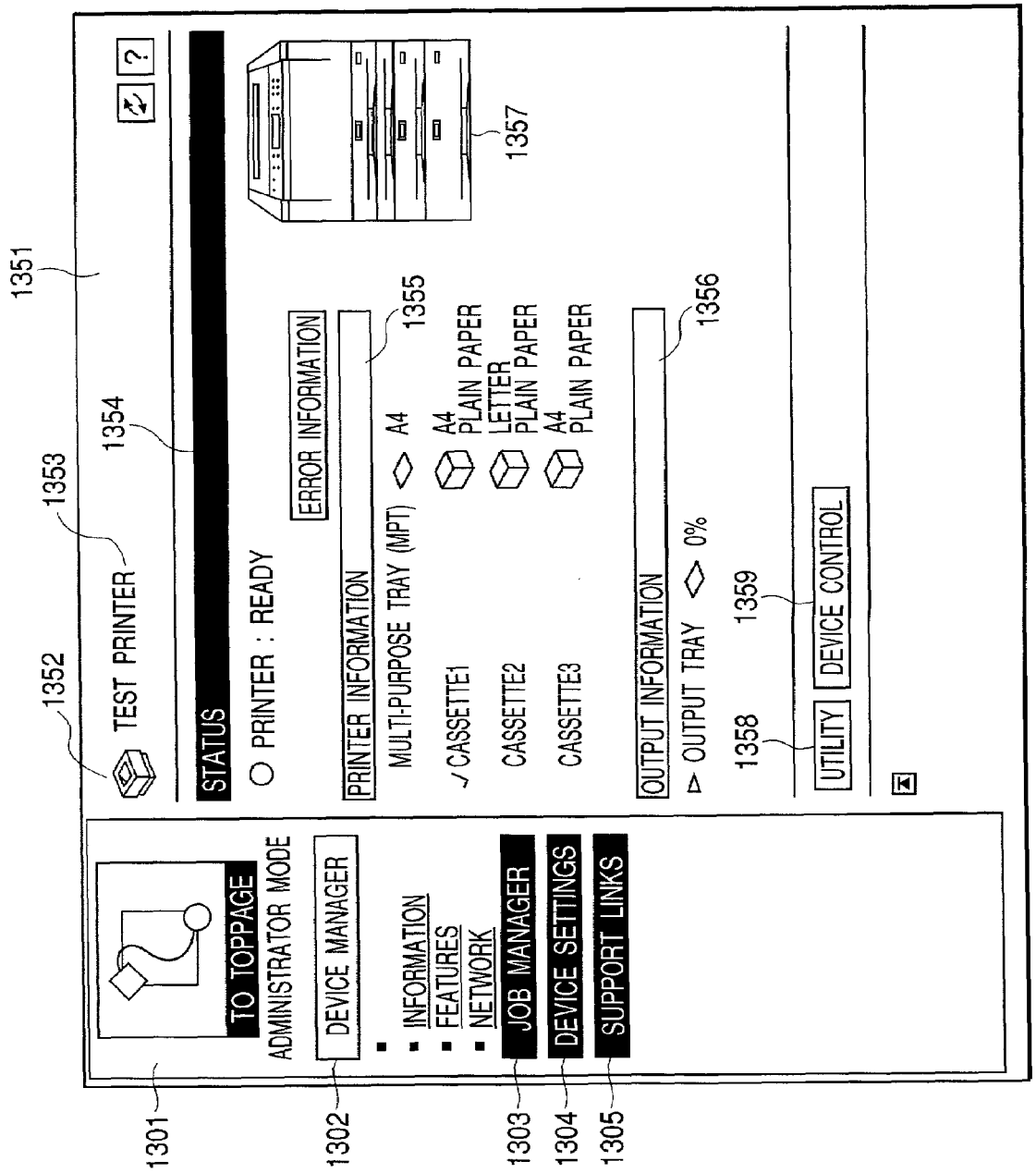
FIG. 13 is an explanatory diagram showing a picture plane on which contents is displayed by a GUI of a host computer.

FIG. 13 is a diagram showing an example in the case where the HTML data or bit map data provided by the WWW server unit 113 of the printer 101 is displayed onto a display by the GUI of WWW browser software of the host computer 100. In FIG. 13, a construction of a picture plane is divided into two frames comprising a mode switching frame 1301 and a mode display frame 1351.

In the mode switching frame 1301, in order to, divide and display the picture plane every service content for WWW services having many functions, buttons each for urging the operator to shift to each mode are arranged. There are a button 1302 to shift to a device management mode (Device Manager), a button 1303 to shift to a job management mode (Job Manager), a button 1304 to shift to a device management mode (Device Settings), and a button 1305 to shift to a support link mode (Support Links). Each button shows a shift to each mode.

The mode display frame 1351 shows a mode for displaying a device management status and is constructed by the following component elements in order from the top of the diagram. That is, 1352 showing a bit map icon of the apparatus; 1353 showing a name of the apparatus; 1354 showing an apparatus status (Status); 1355 showing an amount of paper enclosed in a paper feeding apparatus (a manual insertion tray, an upper cassette, a lower cassette, a paper deck, an envelope feeder) (Printer Information); 1356 showing a status of a paper delivery apparatus (a paper delivery tray, bins 1, 2, and 3) (Output Information); bit map image data 1357 showing a construction of the apparatus; a button 1358 to instruct activation of utility (Utility); and a button 1359 to instruct activation of a device control (Device Control).

Subsequently, the WEB contents will be described. The reason why the WWW server unit 113 is provided for the printer 101 is to enable status monitoring, initial value setting, and a control of a print job of the printer 101 to be executed by the WWW browser held in the host computer 100. The WWW server unit 113 operates as a database for providing the WEB contents requested by the host computer 100.

FIG. 2 is a diagram showing an example of an expression of the fundamental HTML (Hyper Text Markup Language). This expression has been simplified for the purpose of describing. Actually, a further complicated document is described. In FIG. 2, a line <!DOCTYPE HTML PUBLIC "-//IETF//DTD HTML 2.0//EN"> denotes a text type declaration in an SGML (Standard Generalized Markup Language) document and shows that this document is the HTML.

The HTML document is described in an area between <HTML> and </HTML>.

An area between <HEAD> and </HEAD> shows a header area of the HTML document. A character train "WEB Console Interface" between <TITLE> and </TITLE> shows a title of this document.

An area between <BODY> and </BODY> shows the inside of the HTML document. Two images are fetched in this area.

The first image data is <IMG SRC="/dev/device.png"> and an outline of this image is shown in FIG. 3. Since /dev/device.png is not a URL (Uniform-Resource Locator) expression, it will be understood that it is internal data of the printer 101. Further, /dev/device.png shows an external view of the printer 101 and it will be understood that it is "type-dependent WEB contents" which depends on the type of the printer 101. In case of a printer different from the ordinary printer, that is, in case of a printer of a color type or in case of a printer having a different external view in which the number of paper cassettes is small, /dev/device.png shows a different image.

The second image data is <IMG SRC="/nic/error.png"> and an outline of this image is shown in FIG. 4. Similarly, since /nic/error.png is not a URL expression either, it will be understood that it is internal data of the printer 101. Further, /nic/error.png shows an abstract image for urging the operator to supplement sheets of paper into the cassette and it will be understood that it is "type-independent WEB contents" which-does not depend on the apparatus type.

As mentioned above, the WEB contents is mainly classified into the type-dependent WEB contents and type-independent WEB contents. Usually, since it is requested that the network card unit 110 of the printer 101 is provided for the printers of a plurality of models by a single product, the type-dependent WEB contents is stored into the type-dependent contents storing unit 122 in the printing unit 120, while the type-independent WEB contents is stored into the type-independent contents storing unit 115 in the network card unit 110. In this manner, the printer 101 stores the WEB contents separately as type-dependent WEB contents and type-independent WEB contents. Further, as WEB contents which is stored into the type-dependent contents storing unit 122, the WEB contents according to the apparatus type is stored. For example, in case of device.png in FIG. 3, the image data showing an outline according to the apparatus type is stored.

Subsequently, a method of separately obtaining the type-dependent WEB contents and the type-independent WEB contents will be described. A path structure is used for distinguishing them. It is assumed that in case of the WEB contents starting with /dev/, the WEB contents is obtained from the type-dependent contents storing unit 122 as type-dependent WEB contents, and in case of the WEB contents starting with /nic/, the WEB contents is obtained from the type-independent contents storing unit 115 as type-independent WEB contents.

Figure 5:
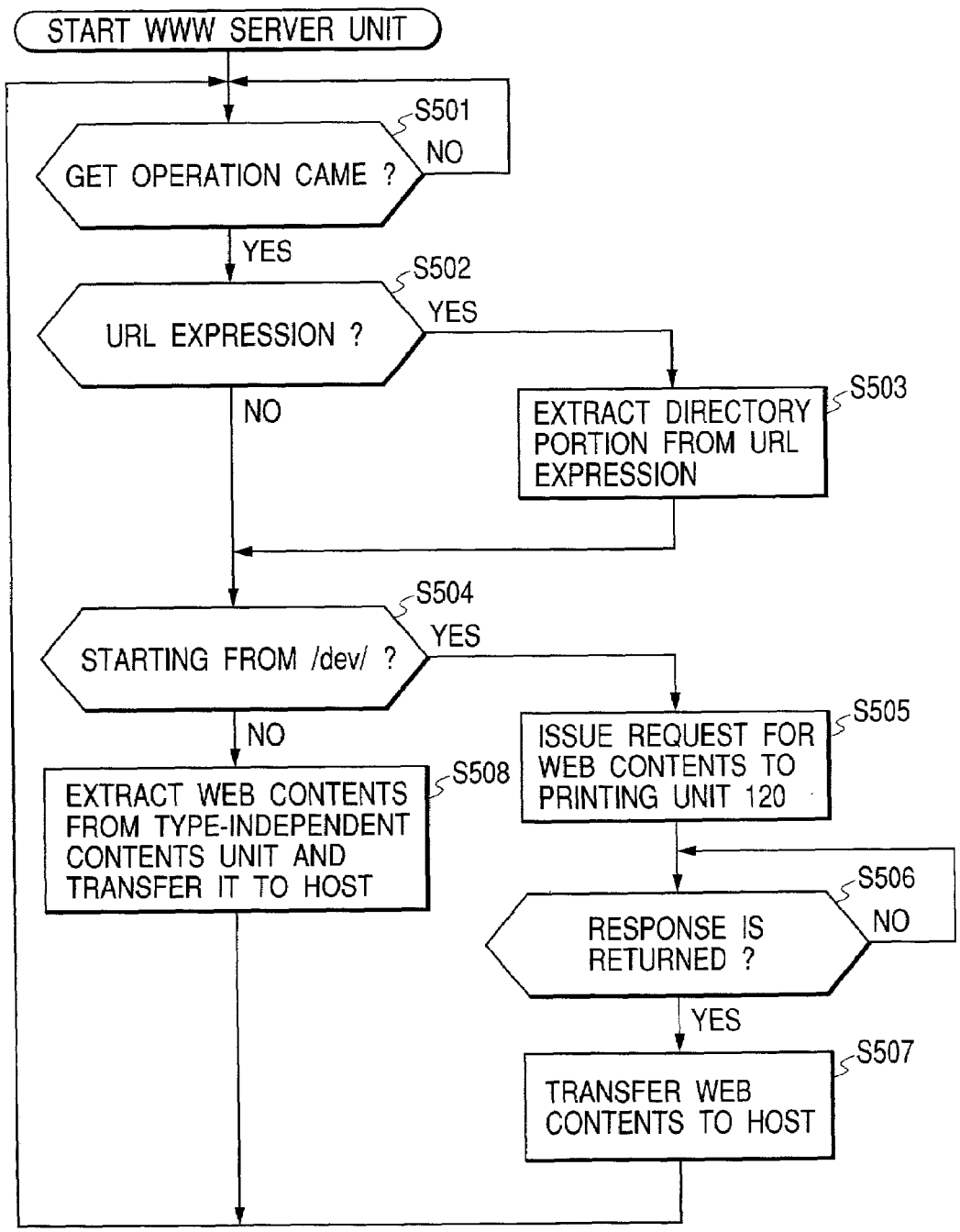
FIG. 5 is a flowchart showing the operation of a WWW server unit.

FIG. 5 is a flowchart showing the operation of the WWW server unit 113 of the printer 101. The WWW server unit 113 is activated together with the activation of the printer 101 and continues the service until a power source is turned off. When the service is started, in step S501, the WWW server unit 113 waits for the getting operation (GET operation) from the host computer 100. The GET operation denotes an operation for requesting the WEB contents in the HTTP and the processing routine is looped to the head until the GET operation comes.

When the GET operation comes from the host computer 100, in step S502, the WWW server unit 113 checks the WEB contents requested by the GET operation and discriminates whether the WEB contents has been designated by the URL expression or not. For example, if a designated WEB contents name is http://printer.domain/dev/device.html http:// is a scheme and printer.domain is a domain name, so that both of them are excluded and only /dev/device.html is extracted.

Further, in step S504, the WWW server unit 113 discriminates whether the extracted WEB contents name starts with /dev/ or not. A rule is defined so as to obtain the WEB contents (type-dependent WEB contents) whose WEB contents name starts with /dev/ from the printing unit 120. Therefore, if the WEB contents name starts with /dev/, in step S505, the WWW server unit 113 issues an obtaining request of the WEB contents to the printing unit 120. In step S506, the WWW server unit 113 waits for a response from the printing unit 120. When the response is returned from the printing unit 120, in step S507, the requested WEB contents is provided to the host computer 100 by a response format of the HTTP.

If the WWW server unit 113 determines in step S504 that the WEB contents is not the WEB contents starting with /dev/ (the type-independent WEB contents), the WEB contents is the WEB contents possessed by the network card unit 110. Therefore, in step S508, the WWW server unit 113 obtains the relevant WEB contents from the type-independent contents storing unit 115 and provides the requested WEB contents to the host computer 100 by the response format of the HTTP.

That is, at this stage, when a path examination of the URL of the WEB con-tents designated by the HTTP from the host computer 100 is performed, the WWW server unit 113 discriminates whether the designated WEB contents is the type-dependent WEB contents or the type-independent WEB contents on the basis of a discrimination result about whether the designated WEB contents is matched with a specific path or not.

When the WWW server unit 113 obtains the WEB contents starting with /dev/ from the type-dependent contents storing unit 122 in the printing unit 120, a remote function call for executing the reading of the WEB contents is performed via the printer I/F unit 114 and network card I/F unit 127. The remote function call requests a file transfer from the network card unit 110 to the printing unit 120.

Figure 8:
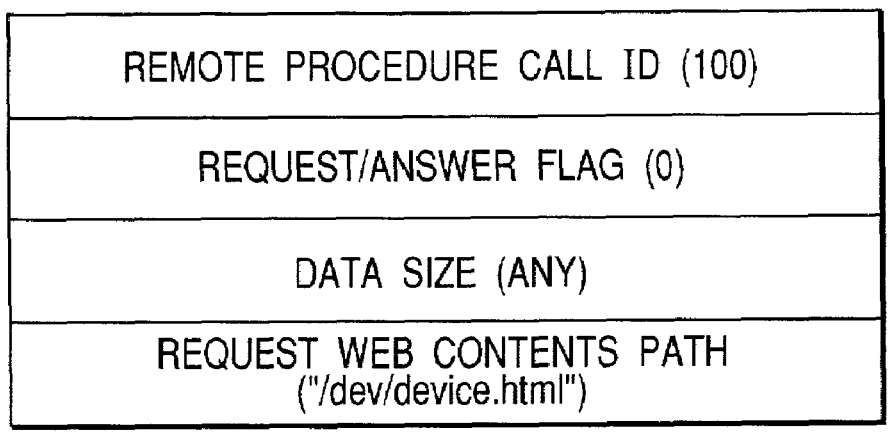
FIG. 8 is an explanatory diagram showing a data structure in a packet format serving as a remote function call at the time when a network card unit requests the WEB contents from a printing unit.

FIG. 8 is a diagram showing a request packet for instructing the reading of the WEB contents by the remote function call. In FIG. 8, a numerical value "100" as a Remote Procedure Call ID indicative of a reading request of the WEB contents, a number "0" indicative of the request, a data size of the packet, and a path of the WEB contents which is requested are transmitted in a packet format. When the packet is correctly interpreted by the network card I/F unit 127 of the printing unit 120, the printing unit 120 transmits a response packet.

Figure 9:
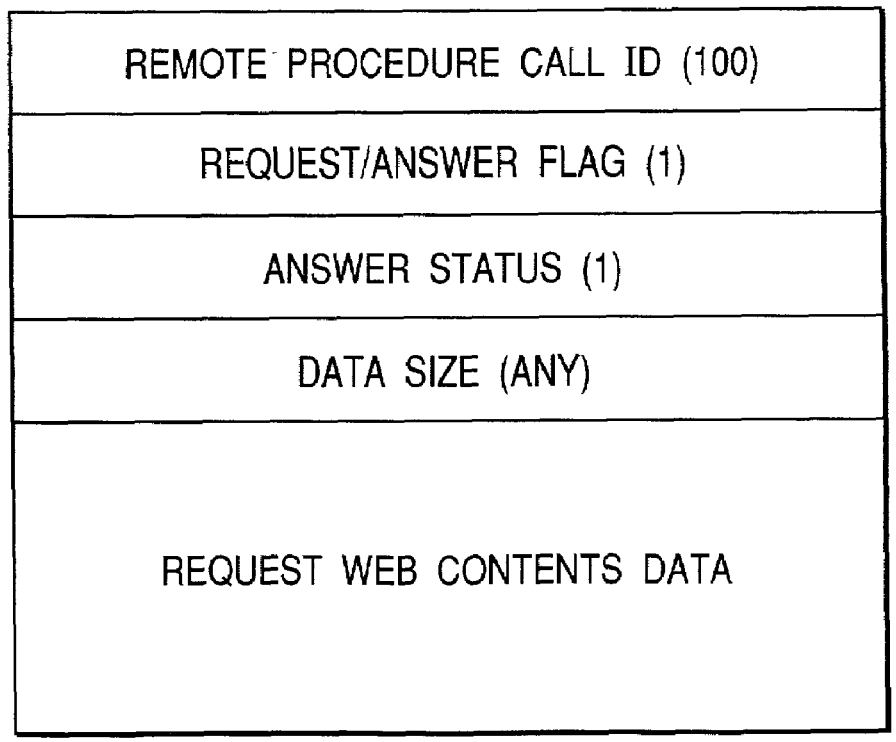
FIG. 9 is an explanatory diagram showing a data structure in the packet format serving as a remote function call at the time when a printing unit transfers the WEB contents to the network card unit.

FIG. 9 is a diagram showing the response packet for transmitting the WEB contents in correspondence to the request packet for instructing the reading of the WEB contents by the remote function call. In FIG. 9, a numerical value "100" as a Remote Procedure Call ID indicative of the reading request of the WEB contents, a number "1" indicative of the response, a response status "1" indicative of the successful reading, a data size of the packet, and binary data of the WEB contents are added and transmitted. The WWW server unit 113 analyzes the response packet, extracts the WEB contents, and transmits the WEB contents to the host computer 100 by the HTTP protocol.

Figure 6:
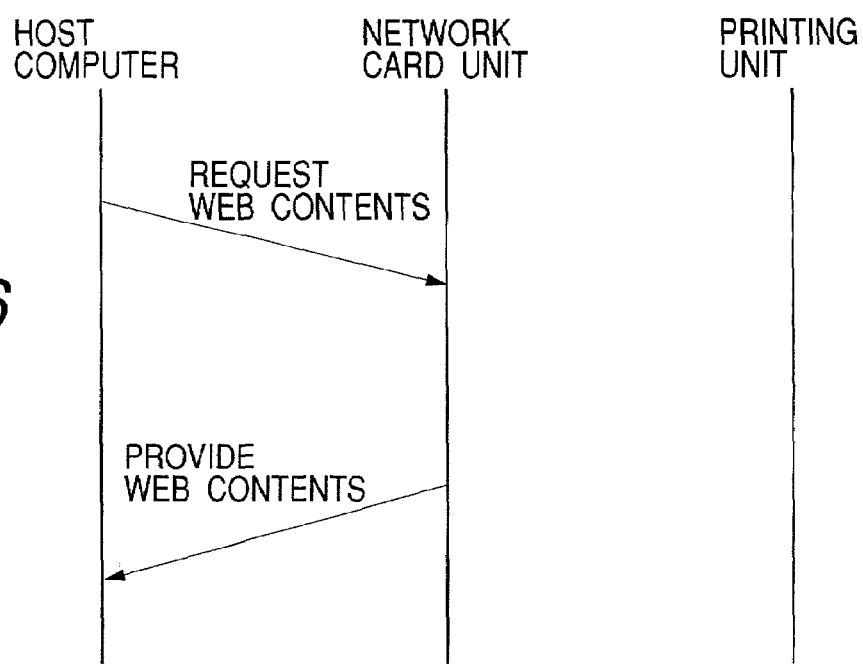
FIG. 6 is an explanatory diagram showing an information transition between modules in case of obtaining type-independent WEB contents.
Figure 7:
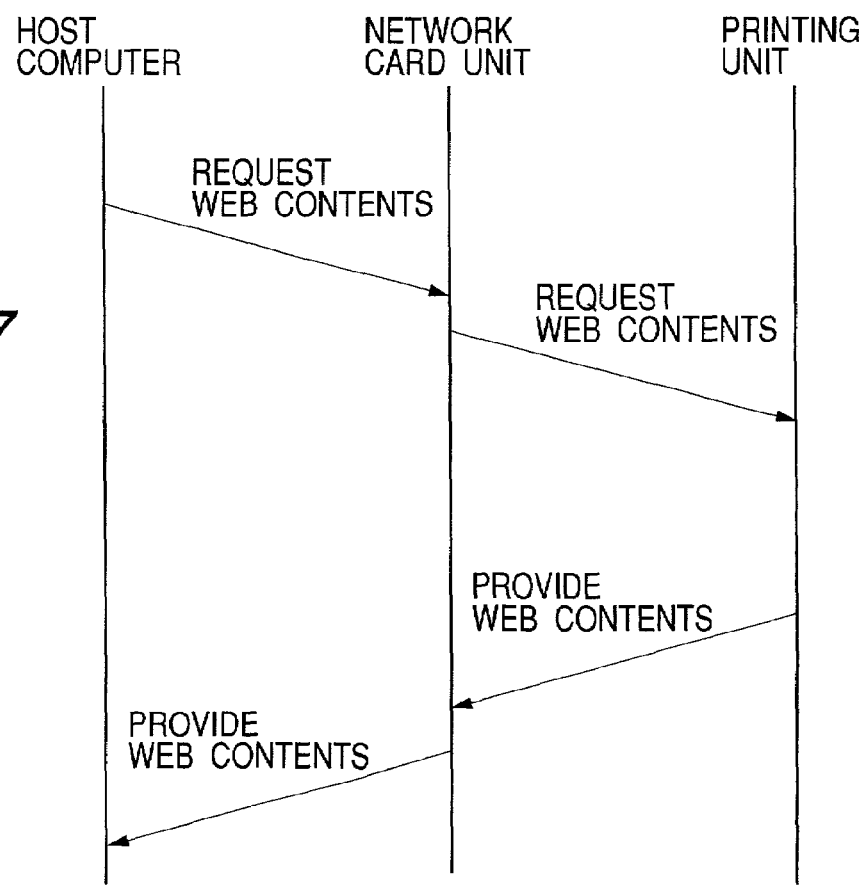
FIG. 7 is an explanatory diagram showing an information transition between modules in case of obtaining type-dependent WEB contents.

The operation among the modules will be explained with the elapse of time. FIGS. 6 and 7 are transition diagrams each showing how the obtaining process of the WEB contents requested from the host computer 100 is executed among the modules. An axis of ordinate indicates the time and a transition of the requests and responses among the host computer 100, network card unit 110 of the printer 101, and printing unit 120.

FIG. 6 shows the operation in the case where "the type-independent WEB contents" is requested. Since the WEB contents exists in the network card unit 110, the request to the printing unit 120 is not generated but the WEB contents is extracted from the type-independent contents storing unit 115 and transmitted to the host computer 100.

FIG. 7 shows the operation in the case where "the type-dependent WEB contents" is requested. Since the WEB contents exists in the printing unit 120, the network card unit 110 makes a request to the printing unit 120, extracts the WEB contents from the type-dependent contents storing unit 122, and transmits it to the host computer 100.

As described above, the WEB-contents is classified into the type-dependent WEB contents and type-independent WEB contents, the type-dependent WEB contents is arranged in the printing unit 120, and the type-independent WEB contents is arranged in the network card unit 110. By distributing and arranging the WEB contents as mentioned above, the following effects can be obtained.

(1) Since the network card unit 110 does not need to possess the WEB contents with respect to the models of all printing units each having a possibility that it is connected to the network card unit 110, costs for a memory capacity of the network card unit 110 can be reduced.

(2) Because of reasons similar to those mentioned above, when coping with peculiar information of printers which are connected to the network card unit 110, that is, printing units which is developed in future, there is no-need to exchange the ROM of the network card unit 110.

(3) When seeing from a situation of the printing unit 120, if the network card unit 110 is unnecessary, the printing unit 120 does not need to have the WWW server unit 113 for transmitting and receiving the WEB contents indicative of the status or the like of the printer by using the HTTP and the type-independent contents storing unit 115 for storing the type-independent WEB contents, so that an increase in costs can be suppressed.

In the above embodiment, whether the WEB contents is the type-dependent WEB contents or the type-independent WEB contents is discriminated on the basis of the discrimination result about whether the character train obtained by excluding the path portion from the URL of the WEB contents includes "/dev/" or not. According to this method, however, whether the WEB contents is the-type-dependent WEB contents or the type-independent WEB contents can be presumed by the GUI of the host computer 100. Since the storing position of the WEB contents is internal information, there is also a case where it is undesirable that the WEB contents can be presumed from the URL.

Therefore, as a countermeasure for disabling the WEB contents from being presumed from the URL, the following method is provided. That is, instead of the discrimination about whether the character train obtained by excluding the path portion from the URL of the WEB contents includes "/dev/" or not, a character train list which is recognized as type-dependent WEB contents is prepared, and the character train list is compared with the WEB contents name as a comparison target.

Figure 10:
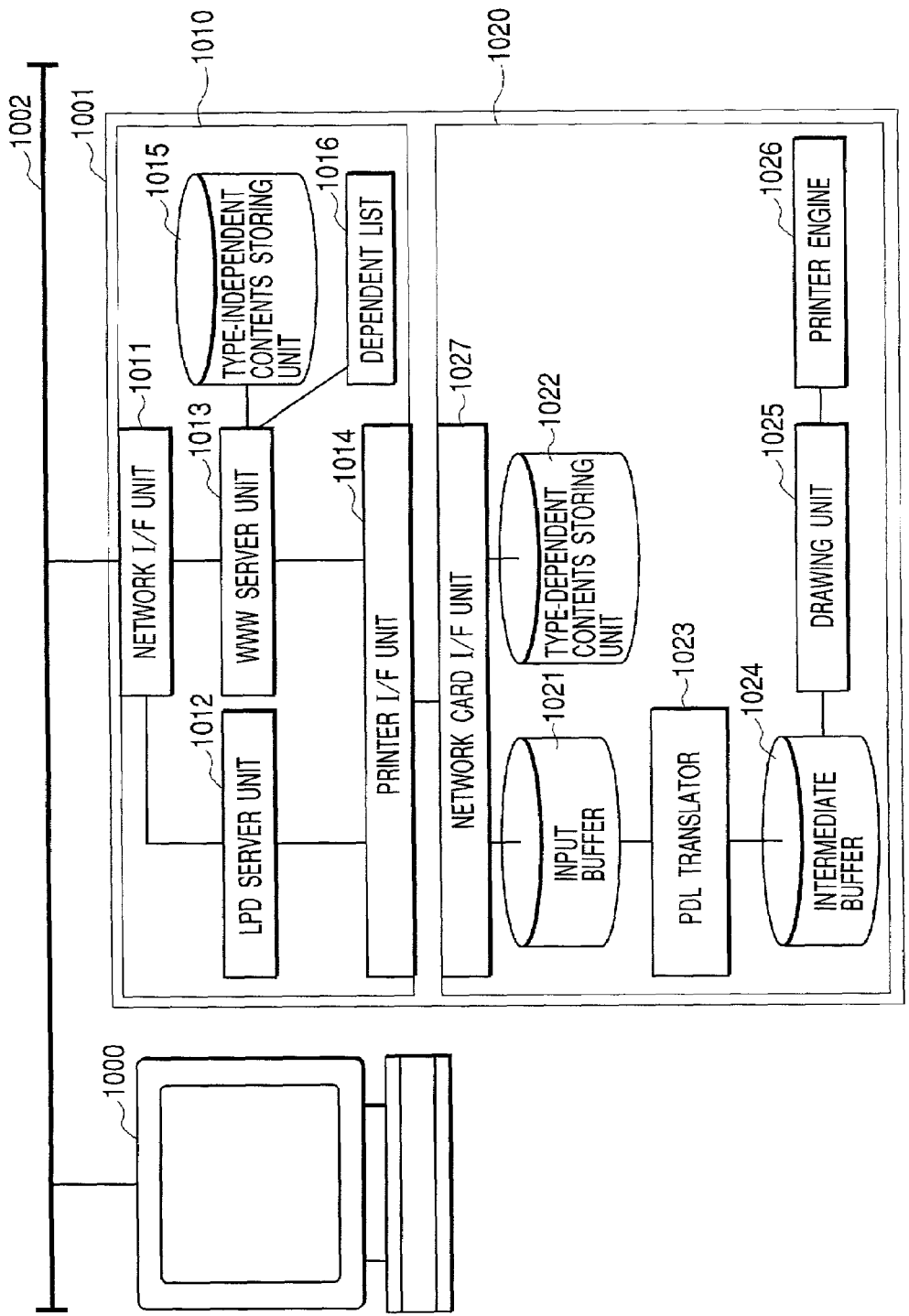
FIG. 10 is a block diagram showing an example of a construction of a print system.

FIG. 10 is a block diagram showing an example of a construction of a print system having a dependent list 1016. This print system is constructed by: a host computer 1000; a printer 1001 having a network card unit 1010 and a printing unit 1020; and a communication medium 1002 for connecting the host computer 1000 and printer 1001.

Further, the network card unit 1010 of the printer 1001 comprises: a network I/F unit 1011; an lpd server unit 1012; a WWW server unit 1013; a printer-I/F unit 1014; a type-independent contents storing unit 1015; and the dependent list 1016. The printing unit 1020 of the printer 1001 comprises: an input buffer 1021; a type-dependent contents storing unit 1022; a PDL translator 1023; an intermediate buffer 1024; a drawing unit 1025; a printer engine 1026; and a network card I/F unit 1027.

FIG. 10 is a diagram obtained by partially modifying FIG. 1. That is, according to FIG. 10, in the construction of FIG.

1, the dependent list 1016 is added to the network card unit of the printer and since other component elements are similar to those in FIG. 1, an explanation of the same portions is omitted here.

Figure 11:
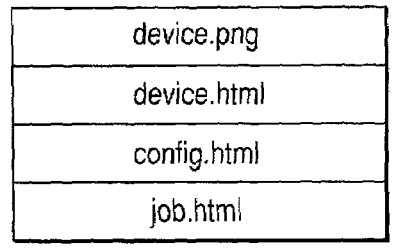
FIG. 11 is an explanatory diagram showing a dependent list.

The dependent list 1016 possessed by the network card unit 1010 of the printer 1001 is a database having a list of character trains. If the dependent list 1016 has a list of character trains as shown in, for example, FIG. 11, the printing unit 1020 is requested to obtain the WEB contents having the same WEB contents name as one of the character trains. In case of other WEB contents, the network card unit 1010 provides them.

Figure 12:
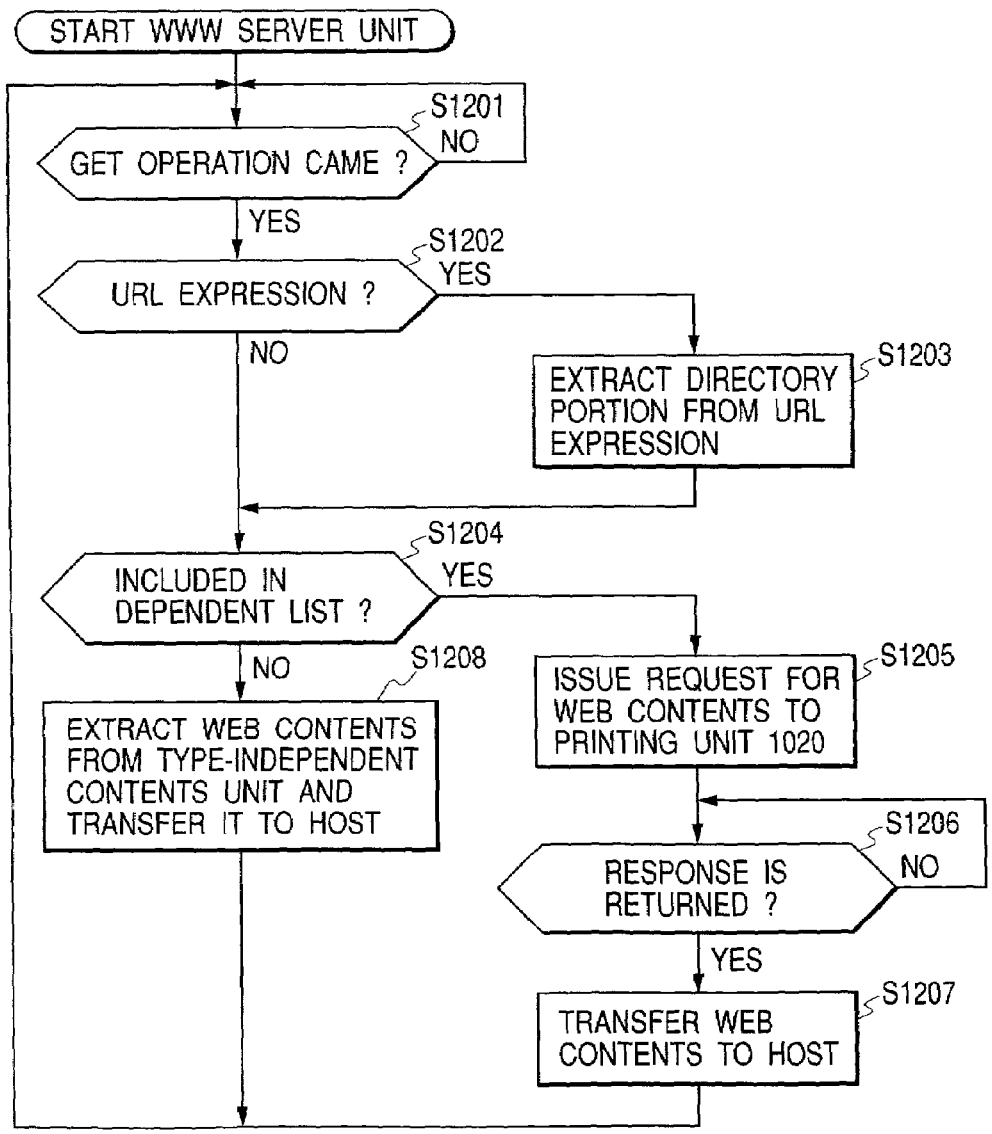
FIG. 12 is a flowchart showing the operation of the WWW server unit.

FIG. 12 is a flowchart showing the operation of the WWW server unit 1013 of the printer 1001. FIG. 12 differs from FIG. 5 with respect to a comparing condition in step S1204. In step S1204, whether the WEB contents name is included in the dependent list 1016 or not. Thus, each WEB contents can be set into the type-dependent WEB contents and type-independent WEB contents irrespective of the URL and path. Since processes in steps S1201 to S1203 and steps S1205 to S1207 in FIG. 12 are similar to those in steps S501 to S503 and steps S505 to S507 in FIG. 5, their explanations are omitted.

As described above, by using the dependent list, the list of character trains which are recognized as type-dependent WEB contents is prepared and the character train list is compared with the WEB contents name as a comparison target. Therefore, the WEB contents can be set into the type-dependent WEB contents and type-independent WEB contents irrespective of the URL and path.

In the foregoing embodiment, the network card unit 1010 of the printer 1001 has the dependent list 1016

On the other hand, in place of the construction such that the network card unit 1010 of the printer 1001 has the dependent list as a list of character trains which are recognized as type-dependent WEB contents, an independent list as a list of character trains which are recognized as type-independent WEB contents can be also provided. Therefore, a discrimination result Yes/No in the comparing condition in step S1204 in FIG. 12 is merely reversed and the processes other than step S1204 are the same as those in FIG. 5.

In FIG. 13, with respect to the bit map image 1357 showing an apparatus construction of the printer 1001, when the user intends to display according to the actual apparatus construction, an image which is displayed differs in accordance with a state where an optional apparatus such as paper feed cassette, duplex apparatus, paper delivery apparatus, etc. is attached to the printer main body.

Therefore, in the following construction, the printer engine 1026 of the printing unit 1020 of the printer 1001 discriminates whether the optional apparatus such as paper feed apparatus, paper delivery apparatus, or the like has electrically been connected to the printer 1001 or not, thereby specifying the apparatus construction of the printer 1001, and the WWW server unit 1013 selects bit map image data corresponding to the apparatus construction of the printer 1001 on the basis of a transfer request of single bit map image data from the host computer 1000 and transmits it to the host computer 1000.

Figure 14:
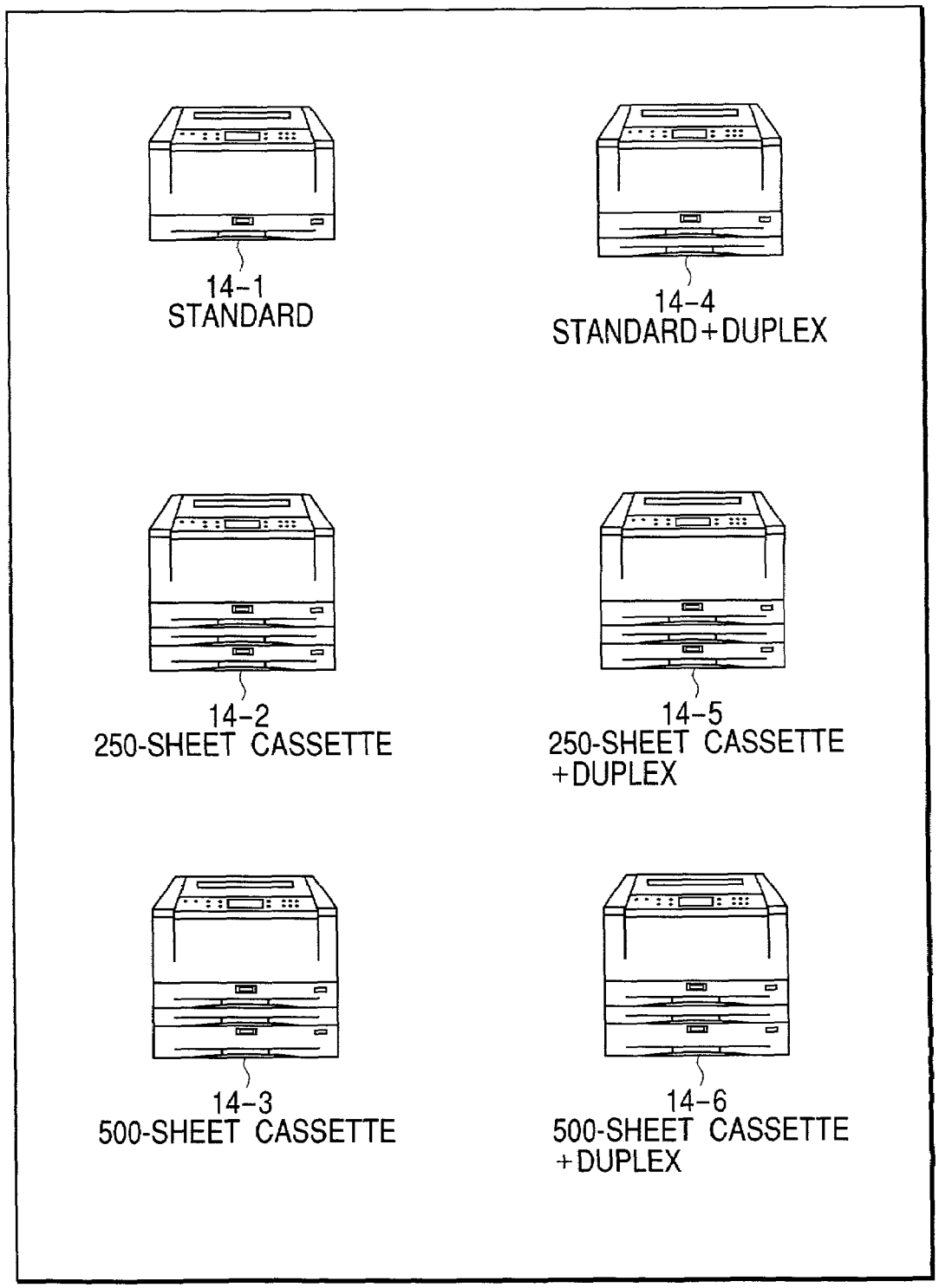
FIG. 14 is a block diagram showing examples of apparatus constructions which can be installed in an apparatus.

A displaying method of the bit map image 1357 corresponding to the apparatus construction will now be described. FIG. 14 is a diagram showing examples of apparatus constructions in the case where various optional apparatuses are installed into a certain apparatus. In this apparatus, in a standard construction, for example, one cassette which can enclose 250 sheets of paper is attached. As an option, one cassette which can enclose 250 sheets of paper or one cassette which can enclose 500 sheets of paper can be connected and, further, a duplex apparatus can be also separately connected. In case of connecting the duplex apparatus, it is necessary to install a reversing apparatus in a lower portion of the duplex apparatus main body in order to reverse the paper in case of printing images onto both of an obverse side and a reverse side of the paper.

In the above specification, for example, there are the following six kinds of combinations which are available as apparatus constructions as shown by the bit map images in FIG. 14, that is, a standard construction (14-1), comprising only the apparatus; a construction (14-2) in which, for example, one cassette which can enclose 250 sheets of paper is connected to the standard construction; a construction (14-3) in which, for example, one cassette which can enclose 500 sheets of paper is connected to the standard construction; a construction (14-4) in which the duplex apparatus is connected to the standard construction; a construction (14-5) in which one cassette which can enclose 250 sheets of paper and the duplex apparatus are connected to the standard construction; and a construction (14-6) in which one cassette which can enclose 500 sheets of paper and the duplex apparatus are connected to the standard construction., Since the paper delivery apparatus can be also added in addition to the foregoing paper cassettes and duplex apparatus in dependence on the apparatus (printer), the number of combinations further increases. FIG. 15 is a diagram showing a correspondence relation among the bit map images (14-1, 14-2, 14-3, 14-4, 14-5, and 14-6 shown in FIG. 14) and "YES" (connected)/"NO" (not connected) of the various optional apparatuses (250-sheet cassette, 500-sheet cassette, and duplex apparatus).

In the actual check of the apparatus construction in the-printer 1001, upon booting of the apparatus, the printer engine 1026 of the printer 1001 discriminates it by checking an electrical connection of a connector equipped for the printer 1001.

The type-dependent contents storing unit 1022 of the printing unit 1020 of the printer 1001 keeps the correspondence relation as shown in FIG. 15. The printing unit 1020 inquires of the printer engine 1026 about the apparatus construction upon booting of the apparatus, selects the bit map image data according to the apparatus construction with reference to the correspondence relation shown in FIG. 15, and returns it in the case where, for example, image.png is requested.

When the host computer 1000 inquires of the printer 1001 about /dev/image.png by using the HTTP, the WWW server unit 1013 of the printer 1001 checks the path construction. If it is determined that the WEB contents is the type-dependent contents, the WWW server unit 1013 inquires of the printing unit 1020. On the basis of contents of the determined apparatus construction upon booting of the apparatus, the printing unit 1020 selects the bit map image according to the apparatus construction from among the bit map images 14-1 to 14-6 shown in FIG. 15, and returns the bit map image data showing the selected bit map image to the WWW server unit 1013.

As described above, even if the host computer 1000 and the network card unit 1010 of the printer 1001 do not know the present apparatus construction of the printing unit 1020 of the printer 1001, merely by inquiring the single bit map image, they can obtain the bit map image data corresponding to the present apparatus construction of the printer.

In the above embodiment, although the bit map image data according to the apparatus construction has been selected from a plurality of bit map image data on the basis of the apparatus construction determined upon booting of the apparatus, there is a case where the HTML contents also changes in dependence on the apparatus construction.

Therefore, in the following construction, the printer engine 1026 of the printing unit 1020 of the printer 1001 discriminates whether the optional apparatus such as paper feed apparatus, paper delivery apparatus, or the like has electrically been connected to the printer 1001 or not, thereby specifying the apparatus construction of the printer 1001, and the WWW server unit 1013 executes a parsing process to the transfer-requested HTML on the basis of a transfer request of the single HTML from the host computer 1000, fetches the apparatus construction as an interpreting condition of an internal SSI (Server Side Include), selects a different HTML in accordance with the apparatus construction of the printer 1001, and transmits it to the host computer 1000.

A case where the HTML contents also changes in dependence on the apparatus construction will be described hereinbelow with respect to the paper feed information (Printer Information) 1355 in FIG. 13. The paper feed information 1355 shows paper feed information in the cassette connected to the apparatus (printer), and its display contents differ in dependence on the apparatus construction at that time.

For example, if there is no option cassette, two lines of the manual insertion tray and the upper cassette are displayed. If the 250-sheet cassette or 500-sheet cassette has been connected, three lines of the manual insertion tray, upper cassette, and lower cassette are displayed. A method of returning the paper feed information to the host computer 1000 in accordance with the apparatus construction by extending the SSI as a function possessed by the WWW server unit 1013 in order to switch those display lines will be described.

The SSI is, generally, a technique such-that a converting process (parsing process) is executed to the WEB contents obtained by the WWW server, a text described in a specific format is converted, and a conversion result is transferred to the client. As one of the SSI formats, there is a method of comparing a definition of a certain variable.

The converting process is a process such that the WWW server of the network card unit of the printer reads the HTML document (technically speaking, SHTML document) held in the printer and converts it into the HTML document which can be analyzed by the browser of the host computer on the basis of a control sentence described in the SHTML document in accordance with the apparatus construction of the printer.

The formats in the SSI are as follows (each line number is written for explanation).

1: <!--#if expr="ENV=VALUE1"-->
2: syntax A
3: <!--#elif expr="ENV=VALUE2"-->
4: syntax B
5: <!--#else-->
6: syntax C
7: <!--#endif-->

In the above format 1:, contents in an environmental variable ENV are examined and when its value is VALUE1, the syntax A is returned to the client. If not, in the above format 3:, the contents in an environmental variable ENV are examined and when its value is VALUE2, the syntax B is returned to the client. If not, the syntax C is returned to the client.

If ENV is a special keyword "LOW-CASSETTE-EXIST", the WWW server unit 1013 of-the printer 1001 inquires of the type-dependent contents storing unit 1022 of the printing unit 1020 about the presence or absence of the lower cassette. In the example, the status obtainment by the remote function call has been presumed. However, if there is means for obtaining another type constructing means (for example, an interface of a job control language or an interface of SNMP/MIB), it can be also used.

Thus, if the lower cassette exists, the WWW server unit 1013 replaces contents of "LOW-CASSETTE-EXIST" with TRUW.

If the WWW contents is <!--#if expr="LOW-CASSETTE-EXIST=TRUE"--> <HttIL expression regarding the lower cassette> <!--#endif-->, only when the lower cassette exists, the HTML expression regarding the lower cassette can be added and returned to the host computer 1000.

Such a procedure can be used not only in the paper feed information 1355 but also in the paper delivery information (Output Information) 1356.

As described above, even if the host computer 1000 does not know the present apparatus construction of the printing unit 1020 of the printer 1001, it can obtain the paper feed information and the paper delivery information from the printer 1001.

In the above embodiment, the transmission and reception of, as it were, static information in which the status is specified upon activation like paper feed information in the paper feeding apparatus for feeding paper to the printer have been described. However, there is a case where the status of the apparatus sequentially changes.

The transmission and reception of dynamic information of the apparatus whose status sequentially changes as mentioned above will be described hereinbelow. In the dynamic information, like a status 1354 shown in FIG. 13 mentioned above, there are a status of a status LED and a status message showing a real-time status of the apparatus, a bit map icon indicative of a remaining amount of paper in the paper feed information 1355, or a bit map icon and a % indicator indicative of a remaining amount of delivery paper in the paper delivery information 1356.

That is, the WWW server unit 1013 of the printer 1001 executes the parsing process to the transfer-requested HTML on the basis of the transfer request of the single HTML from the host computer 1000, fetches the status in the apparatus such as remaining paper amount regarding the paper feed, remaining delivery paper amount regarding the paper delivery in the printer 1001, or the like as an interpreting condition of the internal SSI, selects the different HTML in accordance with the internal apparatus status, and transmits it to the host computer 1000.

Fundamentally, a format in which the SSI used in the above embodiment is used in common will be explained. In the variable ENV, special keywords "STATUS_LED" and "STATUS_MESSAGE" are converted into a file name of a bit map image showing the status LED according to the status of the apparatus and a message according to the status of the apparatus, respectively, and transferred to the host computer 1000.

The WWW server unit 1013 of the printer 1001 searches the variable in the SSI. If STATUS_LED is found, a status code corresponding to the present status is obtained from the printing unit 1020 and the bit map image corresponding to the LED indicator is switched to blue, yellow, and red in accordance with the obtained status code.

Similarly, if STATUS_MESSAGE is found, the WWW server unit 1013 obtains a status code corresponding to the present status from the printing unit 1020, further, obtains a message ("printable" shown in FIG. 13) peculiar to the apparatus corresponding to the status code, and returns the message to the host computer 1000. In this case, the message peculiar to the apparatus is possessed by the type-dependent contents storing unit 1022 of the printing unit 1020. The WWW server unit 1013 calls the message by using the dedicated remote function call and obtains the message.

The dynamic information is transferred to the host computer 1000 in the case where the dynamic information is reloaded (read again) on the WWW browser of the host computer 1000 or after the elapse of a Refresh designation time in the HTML. The dynamic information is automatically updated after the elapse of the designated time.

As described above, also in the case where a dynamic status change occurs in the apparatus (printer), the host computer 1000 can receive the LED image or message corresponding to the dynamic status change from the apparatus. Therefore, an effect that is equivalent to the printer utility can be obtained by using the WWW browser of the host computer 1000.

In the embodiment, when the network card unit of the printer obtains the type-dependent WEB contents from the printing unit, the path starting with /dev/ is unconditionally designated. In the printer, however, it is required that for the printing unit corresponding to a plurality of countries (a plurality of languages), a single network card product can cope with a plurality of languages.

Figure 18:
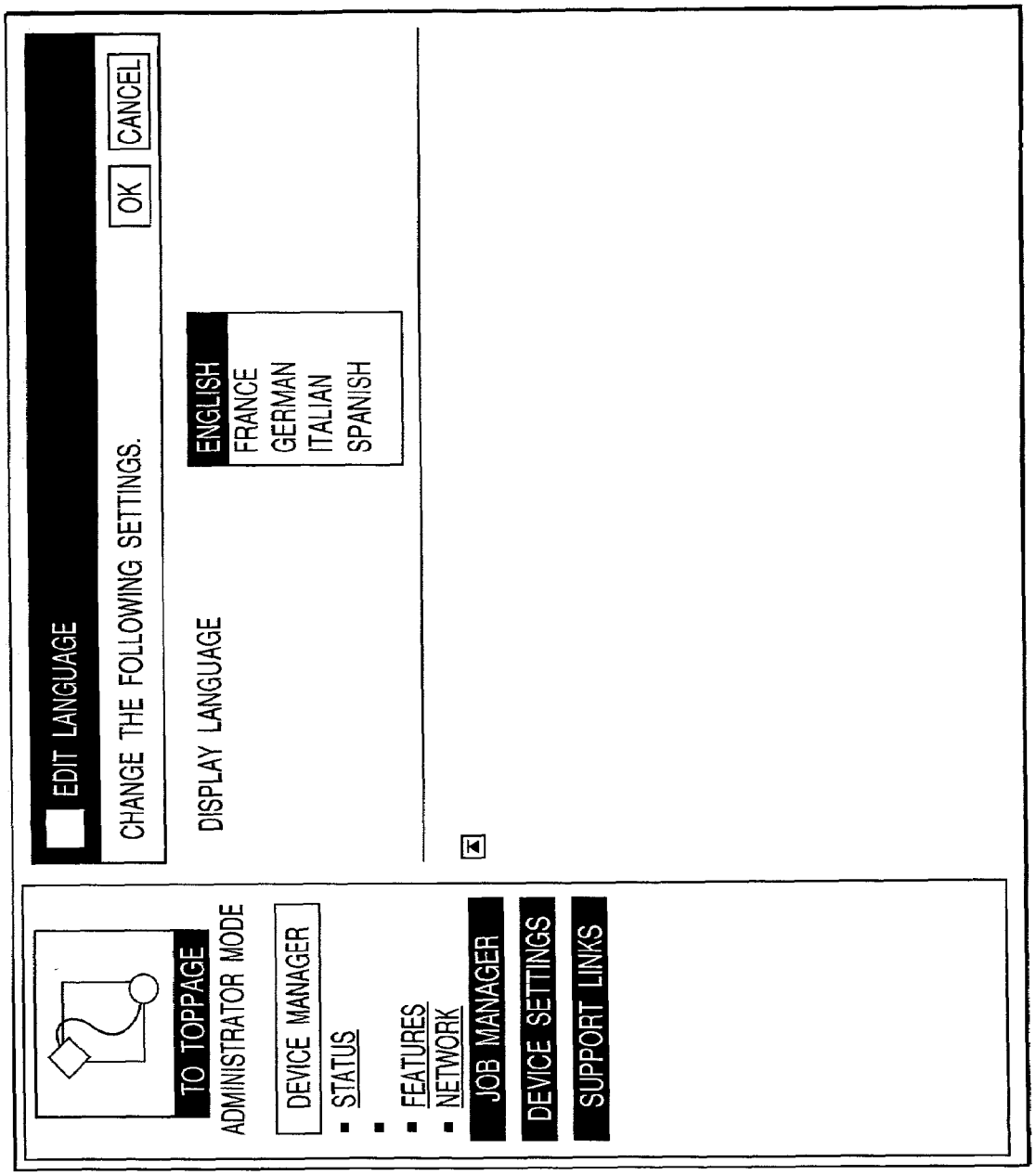
FIG. 18 is an explanatory diagram showing a language selecting picture plane.

Therefore, in the following construction, the network card unit 1010 of the printer 1001 has language selecting means (language selecting frame) which can select a language as shown in a picture plane of FIG. 18 and contents obtaining means for obtaining the type-dependent WEB contents from the printing unit 1020 on the basis of the language selected on the picture plane of FIG. 18, thereby enabling the single network card product to provide the WEB contents corresponding to the selected one of a plurality of languages.

Figure 21:
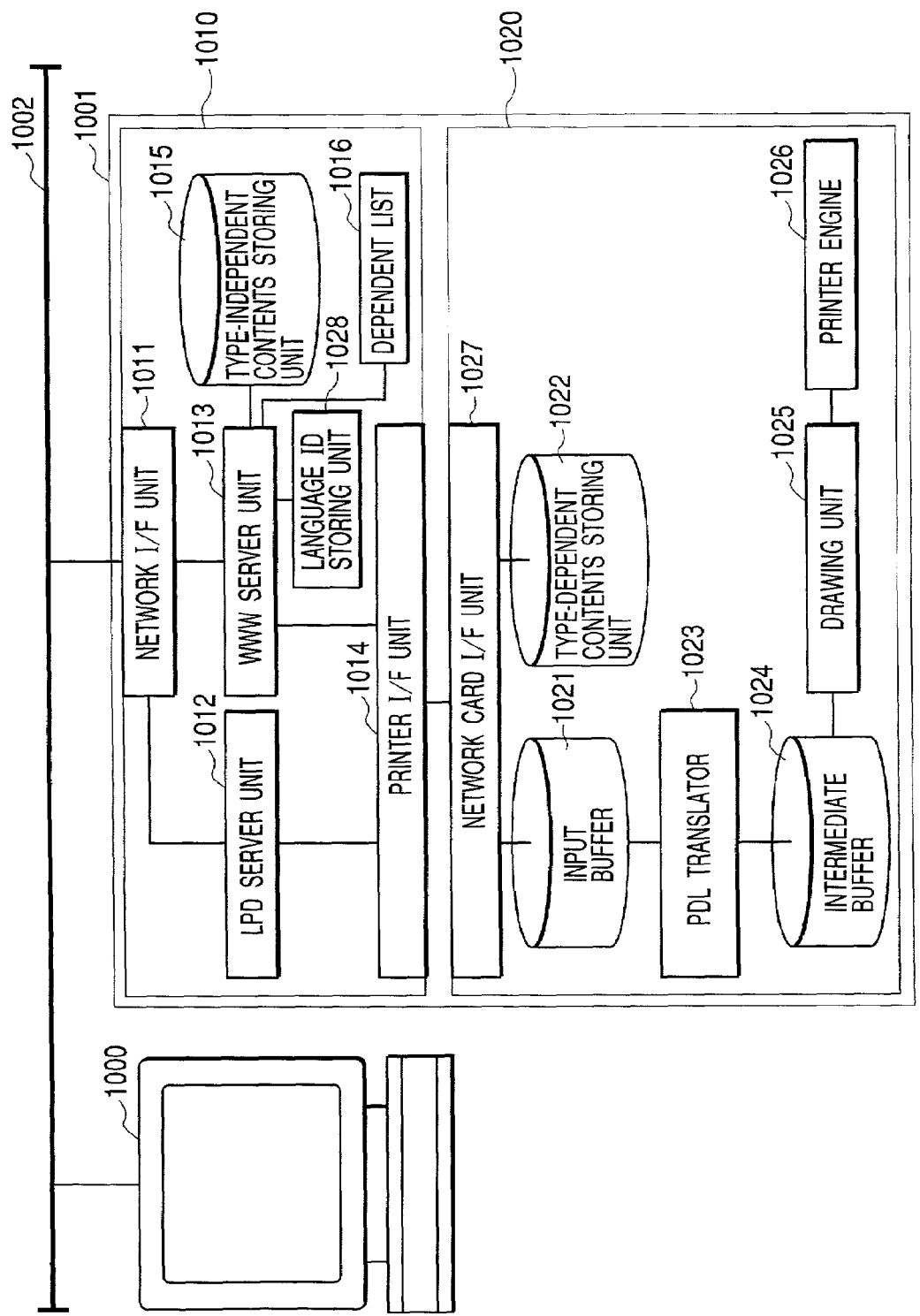
FIG. 21 is a block diagram showing an example of a construction of a print system.

FIG. 21 is a block diagram showing an example of a construction of a print system having a language ID storing unit. This print system is constructed by: a host computer 1000; a printer 1001 having a network card unit 1010 and a printing unit 1020; and a communication medium 1002 for connecting the host computer 1000 and printer 1001.

Further, the network card unit 1010 of the printer 1001 comprises: the network I/F unit 1011; lpd server unit 1012; WWW server unit 1013; printer I/F unit 1014; type-independent contents storing unit 1015; dependent list 1016; and a language ID storing unit 1028. The printing unit 1020 of the printer 1001 comprises: the input buffer 1021; type-dependent contents storing unit 1022; PDL translator 1023; intermediate buffer 1024; drawing unit 1025; printer engine 1026; and network card I/F unit 1027.

FIG. 21 is a diagram obtained by partially modifying FIG. 10. FIG. 21 is obtained by adding the language ID storing unit 1028 to the network card unit 1010 of the printer 1001 in the construction of FIG. 10. Since other component elements are similar to those in FIG. 10, an explanation of the same portions is omitted here.

Figure 16:
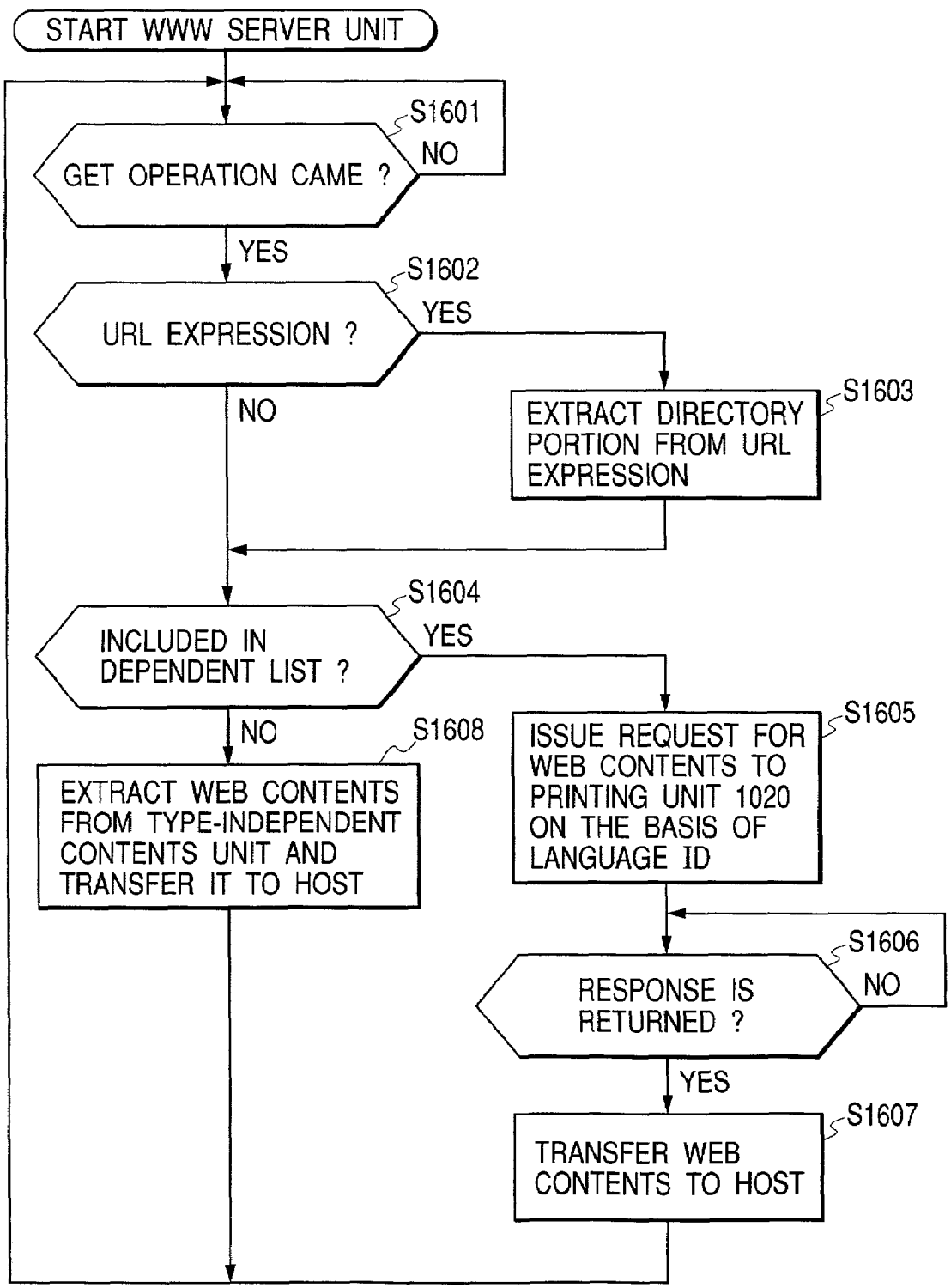
FIG. 16 is a flowchart showing the operation of the WWW server unit.

FIG. 16 is a flowchart obtained by partially modifying FIG. 12. That is, FIG. 16 is obtained by improving FIG. 12 in a manner such that when the network card unit 1010 of the printer 1001 issues a request for the type-dependent WEB contents to the printing unit 1020, a request for the type-dependent WEB contents is issued on the basis of language ID information (step S1605). Since processes in steps S1601 to S1604 and steps S1606 and S1607 in FIG. 16 are similar to those in steps S1201 to S1204 and steps S1206 and S1207 in FIG. 12, their explanations are omitted.

Figure 17:
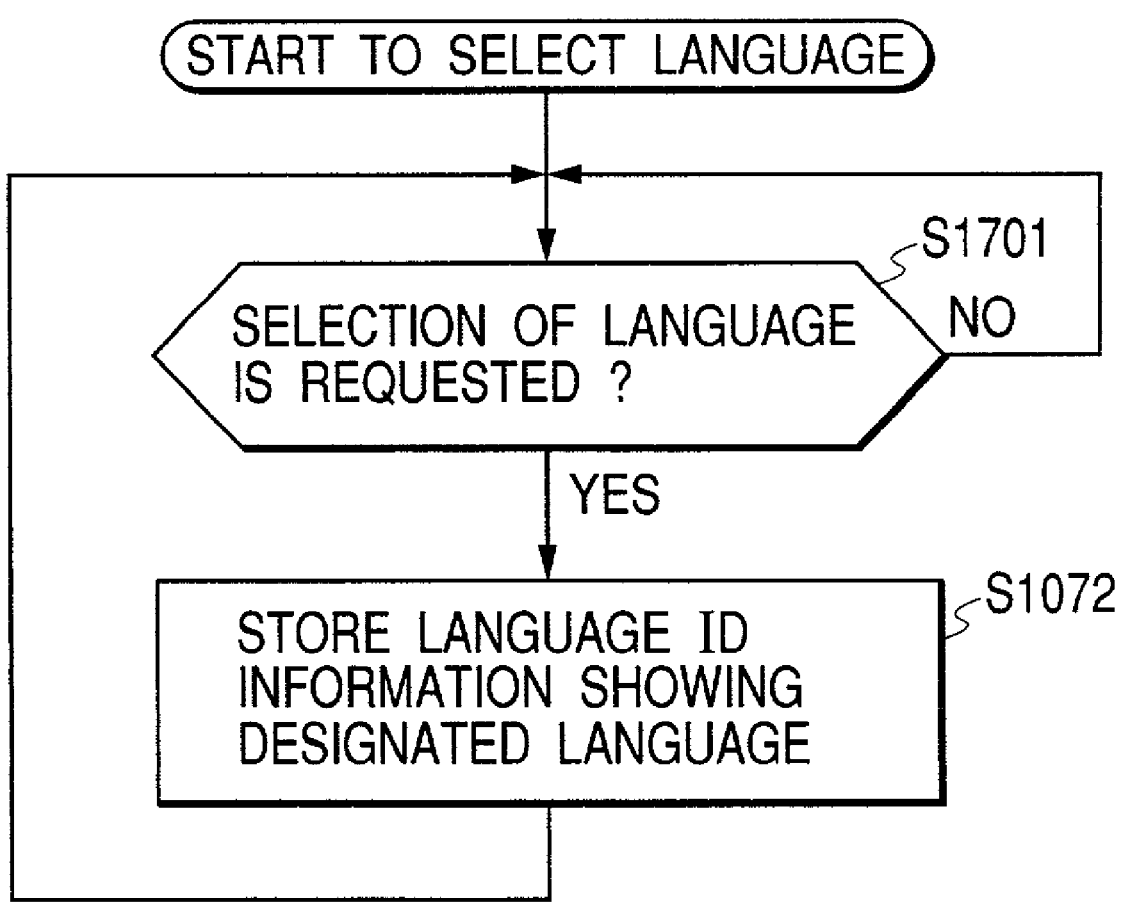
FIG. 17 is a flowchart showing processes of language selecting means which is provided by the network card unit.

FIG. 17 is a flowchart showing processes of the language selecting means (language selecting function) which is provided by the network card unit 1010 of the printer 1001. The network card unit 1010 has HTML data in which a language selection frame corresponding to the picture plane shown in FIG. 18 has been described, and waits until one of the languages is selected by the operator (step S1701). When a desired language is selected, the language ID information showing the selected language is stored into the language ID storing unit 1028 (step S1702).

Figure 20:
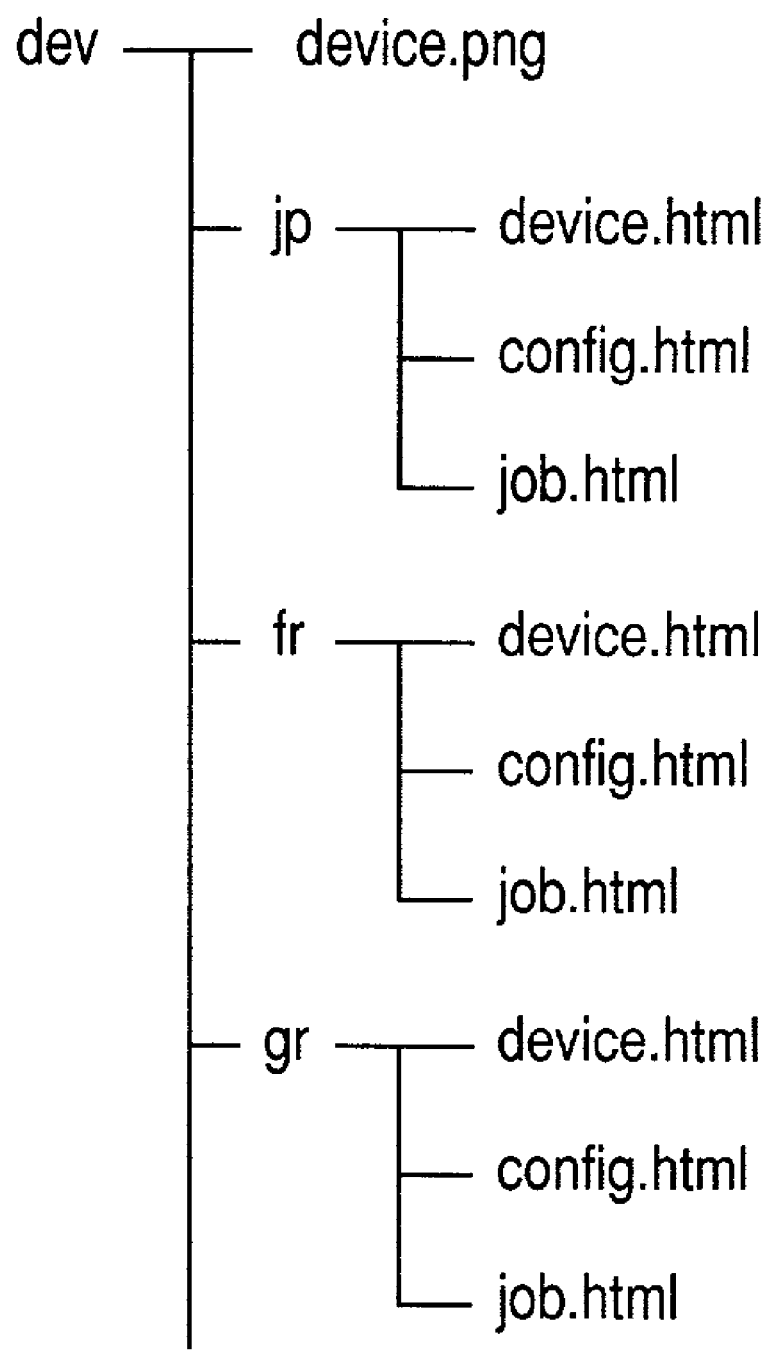
FIG. 20 is an explanatory diagram showing a tree structure of the type-dependent WEB contents.

In the embodiment, although the printing unit 1020 holds the type-dependent contents into the type-dependent contents storing unit 1022, the printing unit 1020 holds the type-dependent contents corresponding to a plurality of languages into the type-dependent contents storing unit 1022 so as to have a tree structure shown in FIG. 20.

Figure 19:
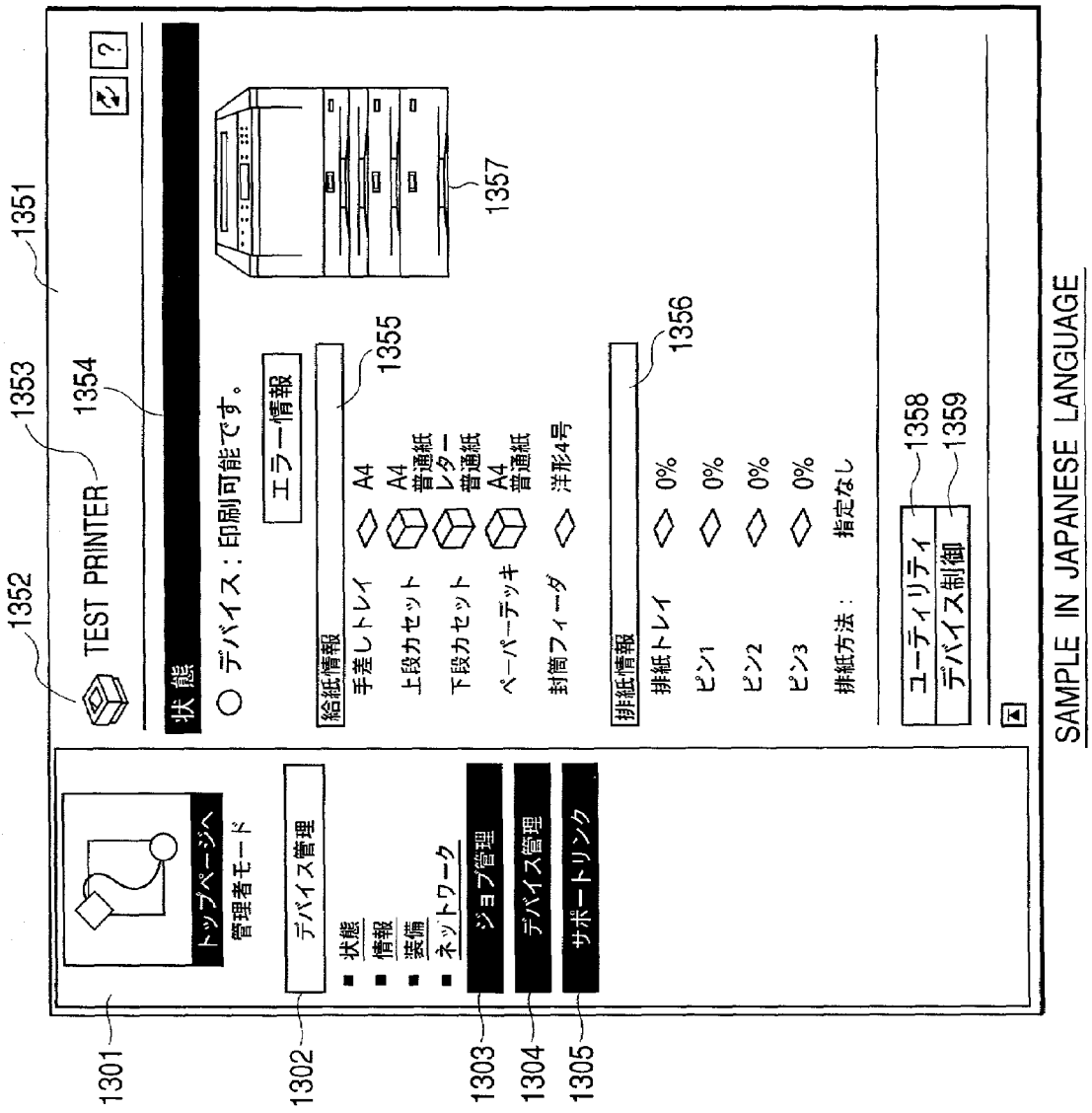
FIG. 19 is an explanatory diagram showing a display example in case of making designation on the basis of language ID information.

In the embodiment, when the network card unit 1010 issues a request for the type-dependent WEB contents to the-printing unit 1020, /dev/device.html has been designated. However, in this instance, for example, if "Japanese" is selected by the language selecting means, when the network card unit 1010 issues a request for the type-dependent WEB contents to the printing unit 1020, /dev/jp/device.html is designated on the basis of the language ID information held in the language ID storing unit 1028, and the type-dependent WEB contents is obtained from the printing unit 1020. FIG. 19 is a diagram showing a display example of WEB contents corresponding to Japanese.

As described above, the printing unit 1020 of the printer 1001 holds the type-dependent WEB contents corresponding to a plurality of languages, the network card unit 1010 has the language selecting means, and the network card unit 1010 requests the type-dependent WEB contents from the printing unit 1020 on the-basis of the language ID information, so that the WWW service corresponding to a plurality of languages can be provided by the single network card product.

In the following construction, the network card unit 1010 has the means for obtaining destination information showing to which market the printing unit 1020 is shipped from the printing unit 1020 when a power source of the printer 1001 is turned on and obtains the type-dependent WEB contents on the basis of the destination information, thereby enabling the single network card product to provide the type-dependent WEB contents corresponding to a language in the destination of the product.

Figure 27:
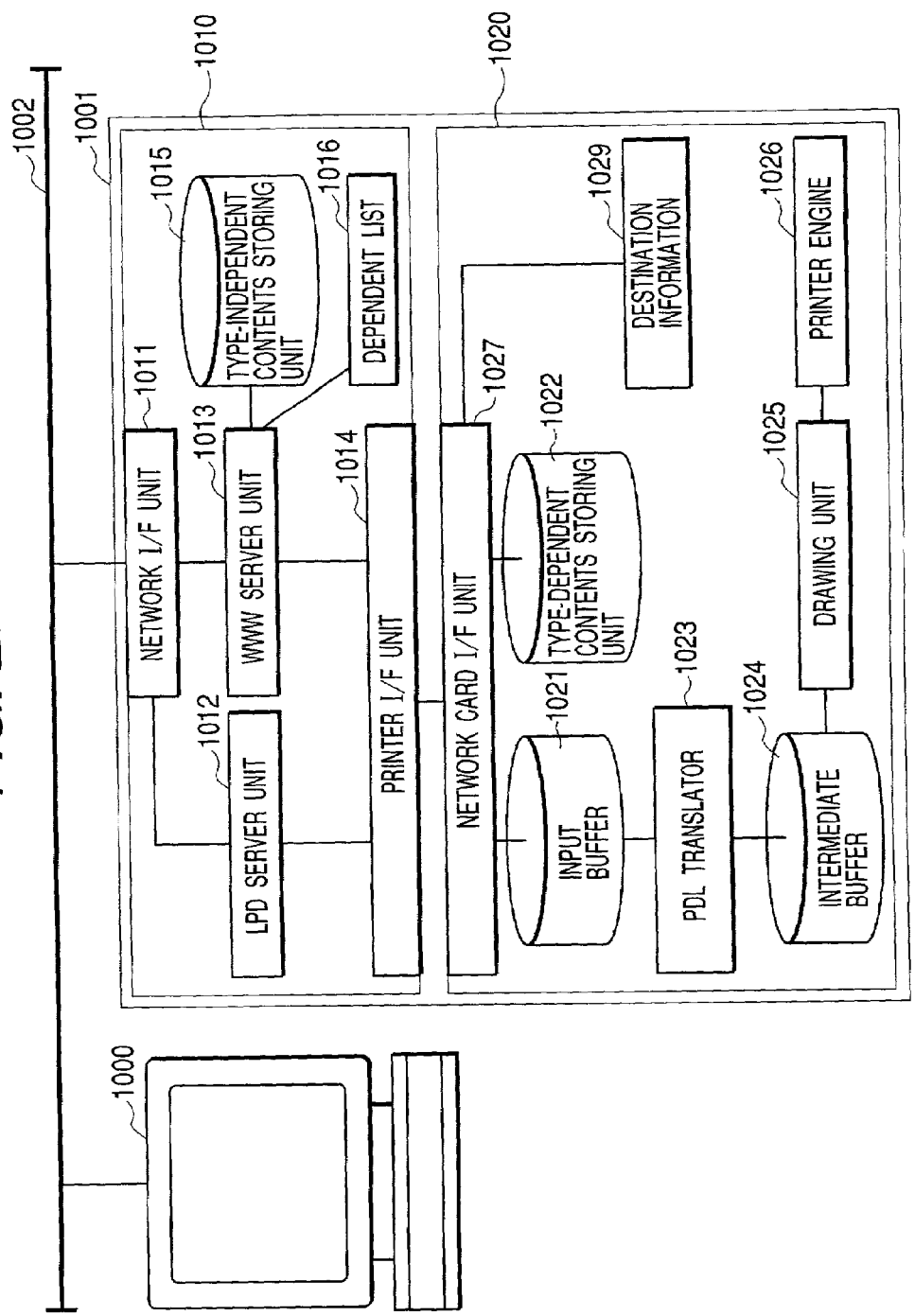
FIG. 27 is a block diagram showing an example of a construction of a print system.

FIG. 27 is a block diagram showing an example of a construction of a print system which holds the destination information. This print system is constructed by: the host computer 1000, the printer 1001 having the network card unit 1010 and printing unit 1020; and the communication medium 1002 for connecting the host computer 1000 and printer 1001.

Further, the network card unit 1010 of the printer 1001 comprises: the network I/F unit 1011; lpd server unit 1012; WWW server unit 1013; printer I/F unit 1014; type-independent contents storing unit 1015; and dependent list 1016. The printing unit 1020 of the printer 1001 comprises: the input buffer 1021; type-dependent contents storing unit 1022; PDL translator 1023; intermediate buffer 1024; drawing unit 1025; printer engine 1026; network card I/F unit 1027; and destination information 1029.

FIG. 27 is a diagram obtained by partially modifying FIG. 10. That is, FIG. 27 is obtained by adding a storing unit of destination in-formation to the printing unit 1020 of the printer 1001 in the construction of FIG. 10. Since other component elements are substantially the same as those in FIG. 10, their explanations are omitted.

Figure 22:
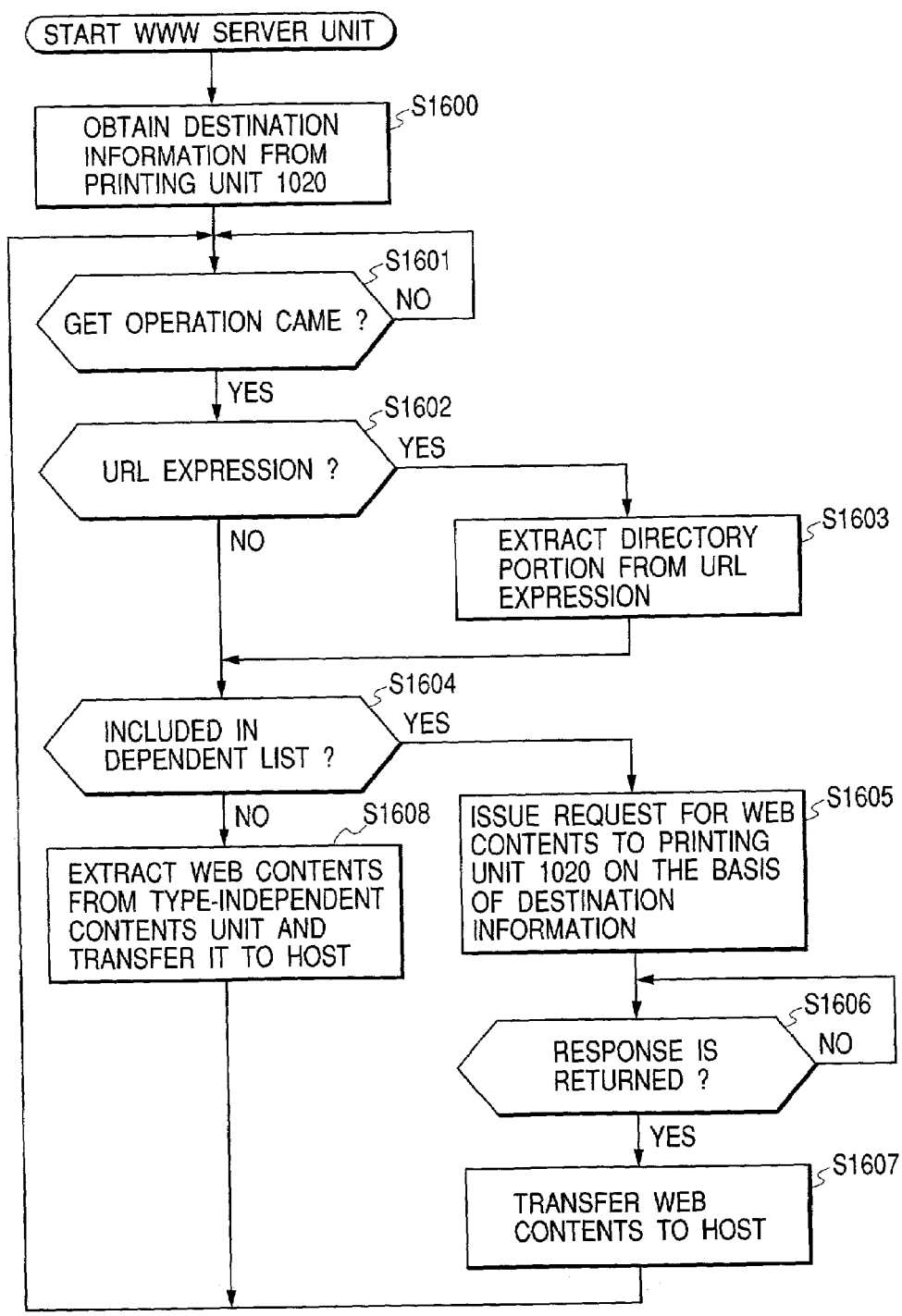
FIG. 22 is a flowchart showing the operation of the WWW server unit.

FIG. 22 is a flowchart obtained by partially modifying FIG. 12. That is, FIG. 22 is obtained by improving FIG. 12 in a manner such that a step (step S1600) of allowing the network card unit 1010 of the printer 1001 to obtain the destination information from the printing unit 1020 and stores it when the power source of the printer 1001 is turned on is added, and when the network card unit 1010 issues a request for the type-dependent WEB contents to the printing unit 1020, the request for the type-dependent WEB contents is issued on the basis of the destination information obtained at the time of the turn-on of the power source (step S1605). Since processes in steps S1601 to S1604 and steps S1606 and S1607 in FIG. 22 are similar to those in steps S1201 to S1204 and steps S1206 and S1207 in FIG. 12, their explanations are omitted.

Figure 25:
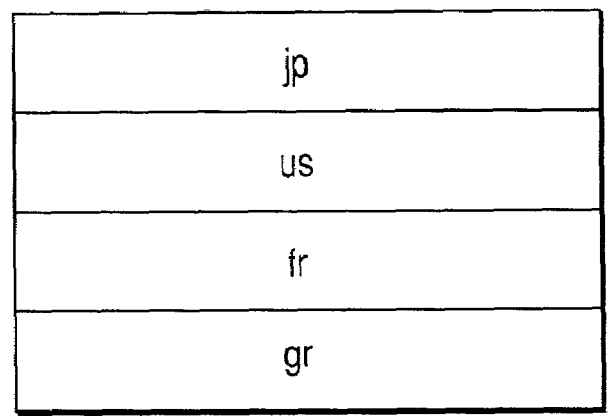
FIG. 25 is an explanatory diagram showing the destination information.

As shown in FIG. 25, the destination information is expressed by simplifying the destination by, for example, characters. "jp" indicates Japan, "us" indicates U.S.A., "fr" indicates France, and "gr" indicates Germany. In place of the characters, the destinations can be also simplified by numerical value. If the network card unit 1010 obtains, for example, "1" as destination information from the printing unit 1020, t his means that the product is shipped to the Japanese market. Similarly, it is also possible to set the destination information "2" to U.S.A. and set the destination in formation "3" to France.

Figure 26:
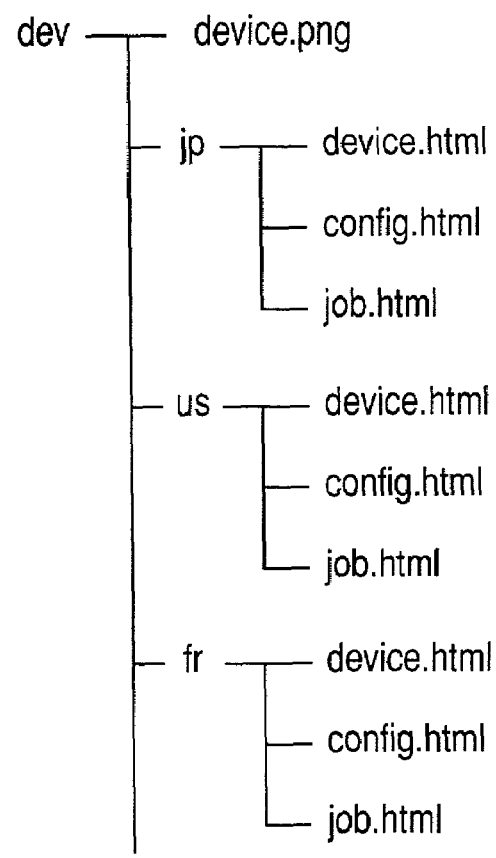
FIG. 26 is an explanatory diagram showing a tree structure of the type-dependent WEB contents.

Although the printing unit 1020 holds the type-dependent WEB contents into the type-dependent contents storing unit 1022 in the foregoing embodiment, in this example, the printing unit 1020 holds the type-dependent WEB contents into the type-dependent contents storing unit 1022 so as to have a tree structure shown in FIG. 26.

Figure 23:
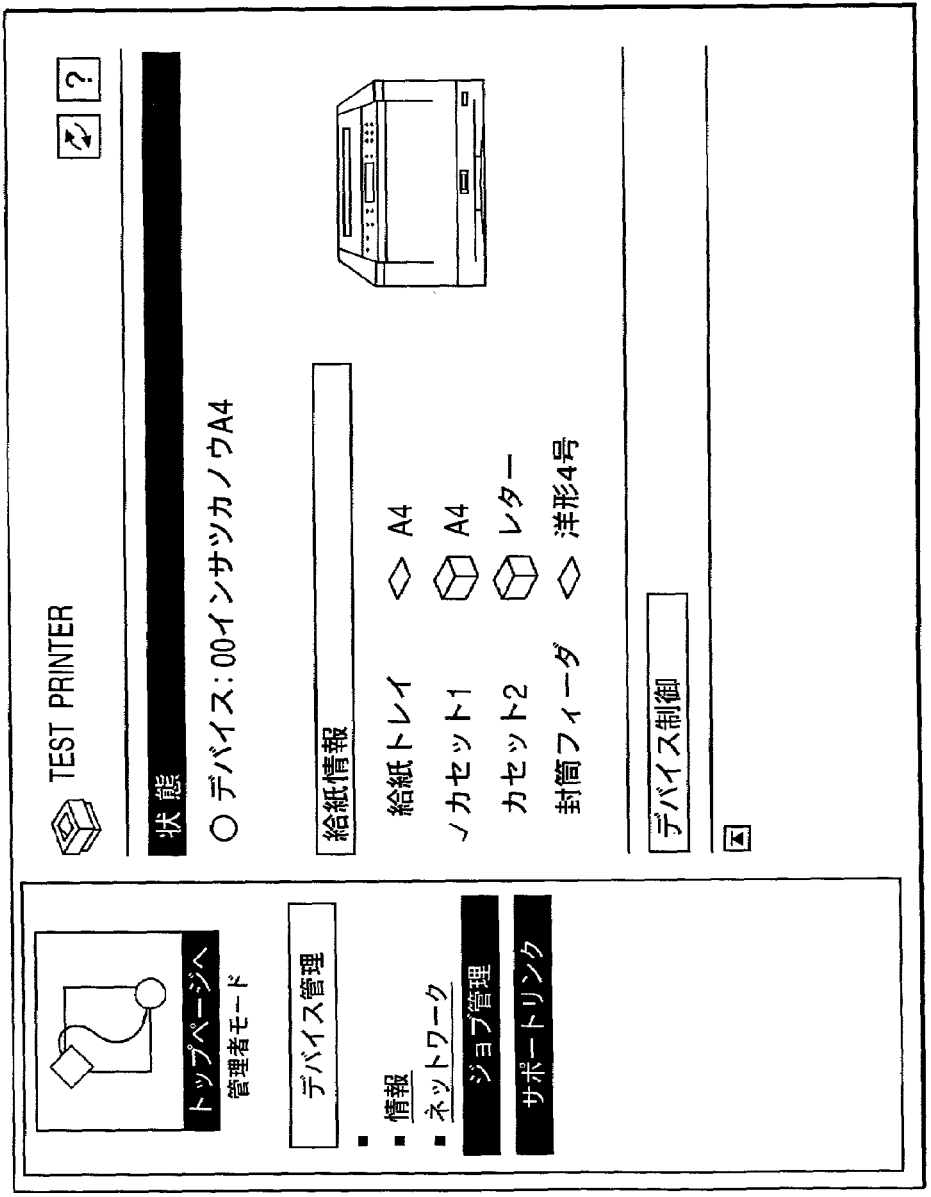
FIG. 23 is an explanatory diagram showing a display example in case of making designation on the basis of destination information.

Although the network card unit 1010 designates /dev/device.html when the request for the type-dependent WEB contents to the printing unit 1020 in the foregoing embodiment, in response to an inquiry about the destination information from the network card unit 1010, the printing unit 1020 notifies "1" and the network card unit 1010 designates /dev/jp/device.html on the basis of the destination information. FIG. 23 is a diagram showing a display example of WEB contents for Japan.

Figure 24:
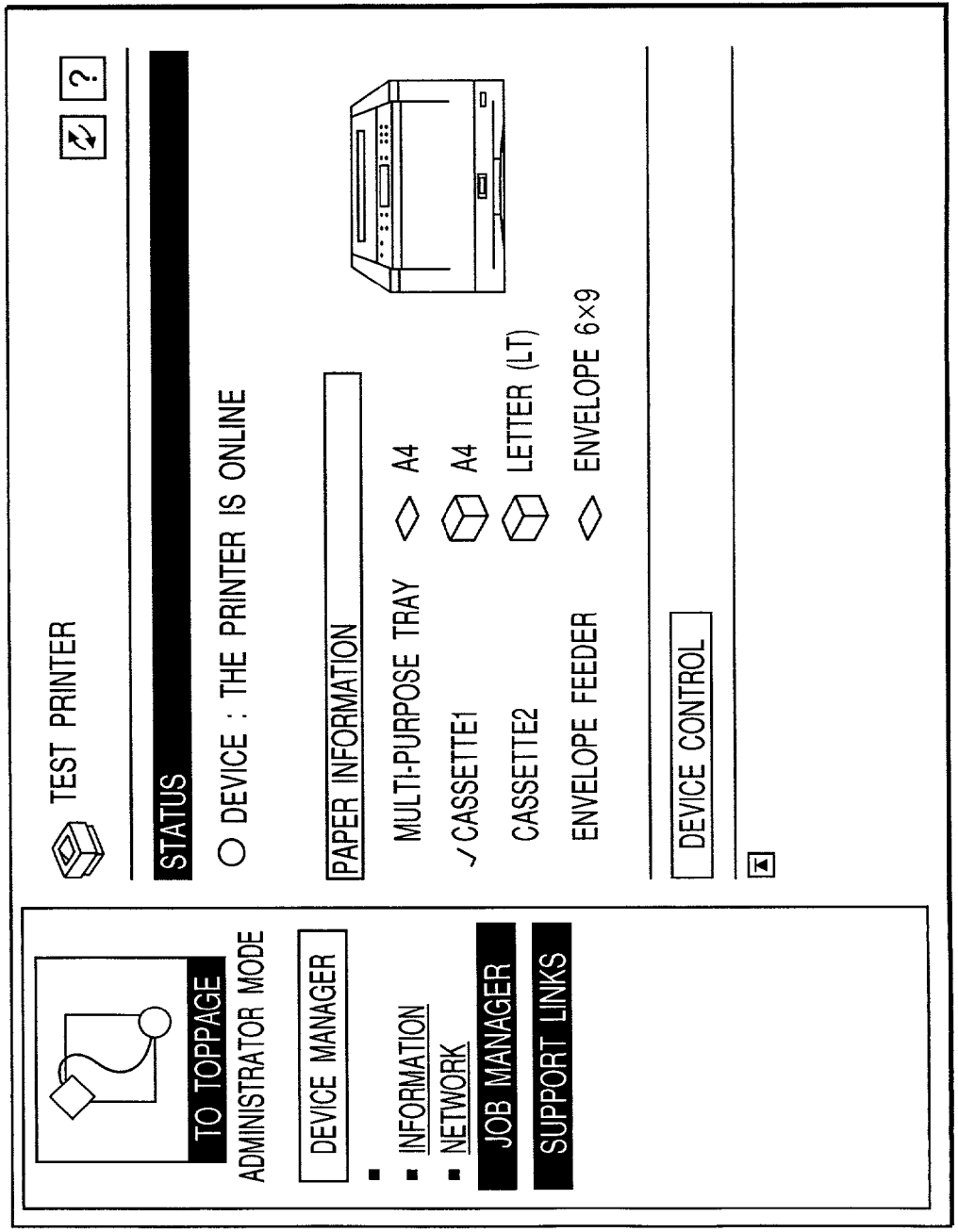
FIG. 24 is an explanatory diagram showing a display example in case of issuing a request for WEB contents.

If the printing unit 1020 is shipped to the U.S. market, in response to obtaining of the destination information from the network card unit 1010, the printing unit 1020 returns "2" to the network card unit 1010. The network card unit 1010 designates /dev/us/device.html when the request for the WEB contents is issued to the printing unit 1020. FIG. 24 is a diagram showing a display example of WEB contents for U.S.A.

As described above, the network card unit 1010 of the printer 1001 requests the type-dependent WEB contents from the printing unit 1020 on the basis of the destination information, so-that the single network card product can provide the WWW services corresponding to a plurality of languages.

OTHER EMBODIMENTS (1) In the above embodiments, although the case where the printer and the host computer are connected by the communication medium such as Ethernet or the like has been described as an example, a communication medium other than the Ethernet can be also used.

(2) In the above embodiments, although the case where the electrophotographic system or the ink jet system is used as a print system of the printer has been described as an example, the invention can be also applied to print systems other than the electrophotographic system or the ink jet system.

(3) In the above embodiments, although the case of the system in which one printer and one host computer are connected has been described as an example, the arbitrary number of printers and host computers can be also connected.

(4) In the above embodiments, although the case of the printer having only the printing function has been described, the invention can be also applied to a hybrid apparatus (multifunction printer: MFP) having an image reading function, a facsimile function, and the like besides the printing function.

The invention can be applied to a system comprising a plurality of apparatuses or can be also applied to an apparatus comprising one equipment. Naturally, the objects of the invention can be also accomplished by a method whereby a medium such as a memory medium or the like in which program codes of software to realize the functions of the embodiments mentioned above have been stored is supplied to a system or an apparatus, and a computer (or a CPU or an MPU) of the system or apparatus reads out the program codes stored in the medium such as a memory medium or the like and executes processes-based on the read-out program codes.

In this case, the program codes themselves read out from the medium such as a memory medium or the like realize the functions of the embodiments mentioned above. The medium such as a memory medium or the like in which the program codes have been stored constructs the invention. As a medium such as a memory medium or the like for supplying the program codes, for example, a floppy disk, a hard disk, an optical disk, a magnetooptic disk, a CD-ROM, a CD-R, a magnetic tape, a non-volatile memory card, an ROM, means for downloading them via a network, or the like can be used.

The invention incorporates not only a case where a computer executes the read-out program codes, thereby realizing the functions of the embodiments mentioned above, but also a case where an OS or the like which operates on the computer executes a part or all of actual processes on the basis of instructions of the program codes, and the functions of the embodiments mentioned above are realized by those processes Further, the invention also incorporates a case where the program codes read out from the medium such as a memory medium or the like are written into a memory equipped for a function expanding board inserted into a computer or a function expanding unit connected to a computer and, thereafter, a CPU or the like equipped for the function expanding board or function expanding unit executes a part or all of actual processes on the basis of the instructions of the program codes, and the functions of the embodiments mentioned above are realized by those processes.

As described above, according to the print system of the invention, if the data designated from the external apparatus is the type-dependent data which depends on the apparatus type, the network card module requests type-dependent data from the printer and provides it to the external apparatus, if the designated data is the type-independent data which does not depend on the apparatus type, the network card module obtains the type-independent data from the database of the network card module and provides it to the external apparatus, so that the network card module does not need to have the data with respect to models of all printers in which there is a possibility to be connected, and the costs for a necessary capacity of the network card module can be reduced.

Because of reasons similar to those mentioned above, upon coping with the peculiar information of a printer which is developed in future as a printer to be connected to the network card module, it is possible to cope with it without exchanging the ROM of the network card module.

When seeing from a point of view of the printer, if the network module is unnecessary, there is no need to have means for transmitting and receiving the requested status of the printer by using the HTTP and means for storing the type-independent data, and an increase in costs can be suppressed.

According to the print system of the invention, when the path examination of the URL of the data designated by the HTTP is made, in order to request data which is matched with the list corresponding to the type-dependent data as type-dependent data from the printer or request data which is not matched with the list corresponding to the type-independent data as type-dependent data from the printer, the data can be set to the type-dependent data or type-independent data irrespective of the URL or path.

According to the print system of the invention, on the basis of the transfer request of the single bit map image from the external apparatus, the bit map image data according to the apparatus construction of the printer and the optional apparatuses is selected and transmitted to the external apparatus. Therefore, even if the external apparatus and network module do not know the present apparatus construction of the printer, they can obtain the bit map image data corresponding to the apparatus construction merely by inquiring the single bit map image.

According to the print system of the invention, on the basis of the transfer request of the single HTML data from the external apparatus, the parsing process based on the internal SSI is executed to the HTML data, and the different HTML data is selected in accordance with the apparatus construction and transmitted to the external apparatus. Therefore, even if the external apparatus does not know the present apparatus construction of the printer, it can obtain information such as paper feed information, paper delivery information, or the like from the printer.

According to the print system of the invention, on the basis of the transfer request of the single HTML data from the external apparatus, the parsing process based on the internal SSI is executed to the HTML data, and the internal status of the apparatus such as information regarding the paper feed or paper delivery in the printer or the like is fetched as an interpreting condition of the SSI, and the different HTML data is selected in accordance with the internal status of the apparatus and transmitted to the external apparatus. Therefore, an effect similar to the printer utility can be obtained by using the WEB browser of the external apparatus.

According to the print system of the invention, on the basis of the language information, the network card module issues the request for the type-dependent data to the printer and obtains the type-dependent data, so that the single network module product can provide the WWW servers corresponding to a plurality of languages.

According to the print system of the invention, on the basis of the destination information showing to which market the printer is provided, the network card module issues the request for the type-dependent data to the printer and obtains the type-dependent data, so that the single network module product can provide the WWW servers corresponding to a plurality of languages.

Effects similar to those mentioned above can be also obtained by the network interface apparatus, printer, data providing method, and memory medium according to the invention.

What is claimed is:

1. A network interface apparatus which is connected to an image processing apparatus and communicates with an external apparatus, comprising:
   a providing unit adapted to provide display data necessary for constructing a picture plane for displaying or setting apparatus information of the image processing apparatus to the external apparatus;
   holding unit adapted to hold language information indicative of a language selected by a user from among a plurality of kinds of languages; and
   data obtaining unit adapted to obtain the display data from the image processing apparatus if the display data necessary for constructing the picture plane depends on an apparatus type of the image processing apparatus and to obtain the display data from said network interface apparatus if the display data necessary for constructing the picture plane does not depend on the apparatus type of the image processing apparatus,
   wherein said data obtaining unit designates the display data based on the language information held by said holding unit to obtain the display data corresponding to the language indicated by the language information held by said holding unit from the image processing apparatus and said providing unit provides the designated display data corresponding to the language indicated by the language information held by said holding unit to the external apparatus, and
   wherein said providing unit provides the display data by using an HTTP (Hyper Text Transfer Protocol), and wherein said data obtaining unit discriminates whether the display data is type-dependent data which depends on the apparatus type of the image processing apparatus or type-independent data which does not depend on the apparatus type of the image processing apparatus on the basis of a URL (Uniform Resource Locator) of the requested data, obtains the display data from the image processing apparatus if the display data is the type-dependent data, and obtains the display data from said network interface apparatus if the display data is the type-independent data.

2. An apparatus according to claim 1, wherein said providing unit provides the display data necessary for constructing a picture plane for selecting the language from among the plurality of kinds of languages, and said holding unit holds the language information indicative of the language selected on the picture plane.

3. An apparatus according to claim 1, wherein the picture plane displays information regarding a paper feed, information regarding a paper delivery, and error information.

4. An apparatus according to claim 1, wherein the display data which depends on the apparatus type of the image processing apparatus is image data showing an external view of the connected image processing apparatus.

5. An apparatus according to claim 1, wherein the image processing apparatus is a printer and said network interface apparatus is a network card which can be connected to a plurality of kinds of printers.

6. An image processing apparatus which is connected to a network interface apparatus for controlling data communication with an external apparatus, comprising:
   storing unit adapted to store type-dependent data which depends on a type of said image processing apparatus in display data necessary for constructing a picture plane for displaying or setting apparatus information of said image processing apparatus; and transfer unit adapted to transfer the type-dependent data stored in said storing unit to the network interface apparatus in accordance with a request from the network interface apparatus, wherein the network interface apparatus designates the type-dependent data based on a language selected by a user from among a plurality of kinds of languages, and provides the designated type-dependent data transferred from said image processing apparatus to the external apparatus, and wherein said transfer unit transfers the designated type-dependent data corresponding to the selected language to the network interface apparatus, and wherein the display data is provided by using an HTTP (Hyper Text Transfer Protocol), and wherein when the display data is obtained, a discrimination is made whether the display data is type-dependent data which depends on the apparatus type of the image processing apparatus or type-independent data which does not depend on the apparatus type of the image processing apparatus on the basis of a URL (Uniform Resource Locator) of the display data, the display data is obtained from the image processing apparatus if the display data is the type-dependent data, and the display data is obtained from said network interface apparatus if the display data is the type-independent data.

7. An apparatus according to claim 6, wherein in accordance with the request from the network interface apparatus, said transfer unit transfers the type-dependent data stored corresponding to the selected language in the type-dependent data stored in said storing unit to the network interface apparatus.

8. An apparatus according to claim 6, wherein said image processing apparatus image processing apparatus is a printer and the network interface apparatus is a network card which can be connected to a plurality of kinds of printers.

9. A data providing method of providing data to an external apparatus from a network interface apparatus which is connected to an image processing apparatus and communicates with the external apparatus, comprising the steps of:

allowing the network interface apparatus to provide display data necessary for constructing a picture plane for displaying or setting apparatus information of the image processing apparatus to the external apparatus;

if the display data necessary for constructing the picture plane depends on an apparatus type of the image processing apparatus, allowing the network interface apparatus to designate the display data based on a language selected by a user from among a plurality of kinds of languages to request the display data corresponding to the selected language from the image processing apparatus;

allowing the image processing apparatus to transfer the designated display data to the network interface apparatus; and if the display data necessary for the picture plane does not depend on the apparatus type of the image processing apparatus, allowing the network interface apparatus to obtain the display data stored in the network interface apparatus, wherein the display data is provided by using an HTTP (Hyper Text Transfer Protocol), and wherein when the display data is obtained, a discrimination is made whether the display data is type-dependent data which depends on the apparatus type of the image processing apparatus or type-independent data which does not depend on the apparatus type of the image processing apparatus on the basis of a URL (Uniform Resource Locator) of the display data, the display data is obtained from the image processing apparatus if the display data is the type-dependent data, and the display data is obtained from said network interface apparatus if the display data is the type-independent data.

10. A method according to claim 9, wherein said network interface apparatus provides the display data in which a picture plane for selecting the language has been described and holds the language information showing the language selected on said picture plane.

11. A method according to claim 9, wherein the image processing apparatus is a printer and said network interface apparatus is a network card which can be connected to a plurality of kinds of printers.

12. A program embodied in a computer storage medium for controlling a network interface apparatus which is connected to an image processing apparatus and communicates with an external apparatus, wherein said program allows a computer to execute:

a providing step of providing display data necessary for constructing a picture plane for displaying or setting apparatus information of the image processing apparatus to the external apparatus; and a data obtaining step of, if the display data necessary for constructing the picture plane depends on an apparatus type of the image processing apparatus, designating the display data based on a language selected by a user from among a plurality of kinds of languages and obtaining the display data corresponding to the selected language from the image processing apparatus, and if the display data necessary for the picture plane does not depend on the apparatus type of the image processing apparatus, obtaining the display data from the network interface apparatus, and wherein said providing step, display data obtained in said data obtaining step is provided to the external apparatus, and wherein said providing step provides the display data by using an HTTP (Hyper Text Transfer Protocol), and wherein said data obtaining step discriminates whether the display data is type-dependent data which depends on the apparatus type of the image processing apparatus or type-independent data which does not depend on the apparatus type of the image processing apparatus on the basis of a URL (Uniform Resource Locator) of the display data, obtains the display data from the image processing apparatus if the display data is the type-dependent data, and obtains the display data from said network interface apparatus if the display data is the type-independent data.

* * * * *

UNITED STATES PATENT AND TRADEMARK OFFICE
CERTIFICATE OF CORRECTION

PATENT NO. : 7,162,518 B2
APPLICATION NO. : 10/081839
DATED : January 9, 2007
INVENTOR(S) : Takahashi It is certified that error appears in the above-identified patent and that said Letters Patent is hereby corrected as shown below:

COLUMN 2:
Line 13, "flu" should be deleted;
Line 22, "is;" should read -- is, --;
Line 44, "contents" should read -- content --;
Line 46, "contents" should read -- content --; and
Line 59, "contents" should read -- content --.

COLUMN 3:
Line 33, "contents" should read -- content --.

COLUMN 4:
Line 16, "let" should read -- jet --.

COLUMN 5:
Line 8, "to," should read -- to --;
Line 11, "are" (second occurrence) should read -- is --;
Line 61, "(Uniform-Resource" should read -- (Uniform Resource --; and
Line 63, "/dev/device.png-shows" should read -- --/dev/device.png shows --.

COLUMN 6:
Line 11, "which-does" should read -- which does --.

COLUMN 7:
Line 14, "con-tents" should read -- contents --.

COLUMN 8:
Line 19, "is" (second occurrence) should read --are --;
Line 20, "no-need" should read -- no need --; and
Line 36, "the-type-dependent" should read -- the type-independent --.

COLUMN 9:
Line 32, "list 1016" should read -- list 1016. --

COLUMN 10:
Line 23, "construction.," should read -- construction. --; and
Line 34, "the-printer" should read -- the printer --.

COLUMN 11:
Line 18, "changes" should read -- change --;
Line 35, "such-that" should read -- such that --; and
Line 66, "of-the" should read -- of the --.

UNITED STATES PATENT AND TRADEMARK OFFICE
CERTIFICATE OF CORRECTION

| | |
|---|---|
| PATENT NO. | : 7,162,518 B2 |
| APPLICATION NO. | : 10/081839 |
| DATED | : January 9, 2007 |
| INVENTOR(S) | : Takahashi |

It is certified that error appears in the above-identified patent and that said Letters Patent is hereby corrected as shown below:

COLUMN 13:
Line 34, "languages.," should read -- languages. --.

COLUMN 14:
Line 32, "the-basis" should read -- the basis --; and
Line 64, "in-formation" should read -- information --.

COLUMN 15:
Line 6, "stores" should read -- store --;
Line 21, "value." should read -- values. --;
Line 23, "t his" should read -- this --; and
Line 53, "so-that" should read -- so that --.

COLUMN 16:
Line 25, "processes-based" should read -- processes based --; and
Line 45, "processes" should read -- processes. --

COLUMN 18:
Line 13, "holding" should read -- a holding --;
Line 16, "data" (first occurrence) should read -- a data --; and
Line 66, "stroring" should read -- a storing --.

COLUMN 19:
Line 4, "transfer" (first occurrence) should read -- a transfer --; and
Line 36, "image processing apparatus" should be deleted.

UNITED STATES PATENT AND TRADEMARK OFFICE
CERTIFICATE OF CORRECTION

PATENT NO. : 7,162,518 B2 Page 3 of 3
APPLICATION NO. : 10/081839
DATED : January 9, 2007
INVENTOR(S) : Takahashi It is certified that error appears in the above-identified patent and that said Letters Patent is hereby corrected as shown below:

COLUMN 20:
Line 45, "wherein" should read -- wherein in --.

Signed and Sealed this

Sixteenth Day of October, 2007

JON W. DUDAS
*Director of the United States Patent and Trademark Office*